(12) United States Patent
Ueno

(10) Patent No.: US 9,421,967 B2
(45) Date of Patent: Aug. 23, 2016

(54) CONTROL DEVICE FOR HYBRID VEHICLE

(71) Applicant: Nissan Motor Co., Ltd., Yokohama-shi, Kanagawa (JP)

(72) Inventor: Munetoshi Ueno, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 3 days.

(21) Appl. No.: 14/375,803

(22) PCT Filed: Mar. 6, 2013

(86) PCT No.: PCT/JP2013/056127
§ 371 (c)(1),
(2) Date: Jul. 31, 2014

(87) PCT Pub. No.: WO2013/137080
PCT Pub. Date: Sep. 19, 2013

(65) Prior Publication Data
US 2015/0019061 A1  Jan. 15, 2015

(30) Foreign Application Priority Data

Mar. 13, 2012 (JP) ................................ 2012-056034

(51) Int. Cl.
*B60L 11/14* (2006.01)
*B60W 20/00* (2016.01)
*B60K 6/48* (2007.10)

(52) U.S. Cl.
CPC ............... *B60W 20/10* (2013.01); *B60K 6/48* (2013.01); *B60L 11/14* (2013.01); *B60W 10/06* (2013.01); *B60W 10/08* (2013.01); *B60W 20/00* (2013.01); *B60W 20/13* (2016.01); B60K 2006/4825 (2013.01); B60W 2520/10 (2013.01); *B60W 2540/10* (2013.01); *Y02T 10/6221* (2013.01); *Y02T 10/6252* (2013.01);

(58) Field of Classification Search
CPC .... B60W 10/08; B60W 10/06; B60W 20/10; B60K 6/48; B60L 11/14
See application file for complete search history.

(56) References Cited

U.S. PATENT DOCUMENTS 6,209,672 B1 * 4/2001 Severinsky ............ B60K 6/442
180/65.23
6,997,275 B2 * 2/2006 Mesiti ...................... B60K 6/48
180/65.25

(Continued)

FOREIGN PATENT DOCUMENTS

JP  2000-329039 A  11/2000
JP  2004-156581 A  6/2004

(Continued)

*Primary Examiner* — Behrang Badii
*Assistant Examiner* — Daniel L Greene
(74) *Attorney, Agent, or Firm* — Global IP Counselors, LLP

(57) ABSTRACT

A control device for a hybrid vehicle is configured to enter a driving mode in which a preset engine-start condition is met, and is configured to enter electric vehicle mode when a preset engine-stop condition is met, and includes an engine-start-condition-controlling device which, during travel in the electric vehicle mode, in the event that an electric vehicle travel zone expansion condition that has been set on the basis of vehicle speed VSP and torque demand information reflective of demand by the driver, and that expands the travel zone in the electric vehicle mode, is met, changes the engine-start condition from a baseline start condition, to an expansion engine-start condition for expanding the travel zone in the electric vehicle mode, doing so for the duration of a prescribed time thereafter.

12 Claims, 17 Drawing Sheets

(56) References Cited

U.S. PATENT DOCUMENTS

| | | | | |
|---|---|---|---|---|
| 2002/0123836 A1* | 9/2002 | Komiyama | B60K 6/46 | 701/51 |
| 2005/0101433 A1* | 5/2005 | Joe | B60K 6/445 | 477/5 |
| 2005/0211479 A1* | 9/2005 | Tamor | B60K 6/48 | 180/65.25 |
| 2006/0048982 A1* | 3/2006 | Yamamoto | B60K 6/44 | 180/65.225 |
| 2007/0102207 A1* | 5/2007 | Yamanaka | B60K 6/48 | 180/65.31 |
| 2007/0227791 A1* | 10/2007 | Ueno | B60K 6/387 | 180/65.245 |
| 2008/0262694 A1* | 10/2008 | Heap | F02D 41/068 | 701/102 |
| 2013/0158838 A1* | 6/2013 | Yorke | B60W 10/06 | 701/103 |

FOREIGN PATENT DOCUMENTS

| | | |
|---|---|---|
| JP | 2007-261442 A | 10/2007 |
| JP | 2010-143423 A | 7/2010 |
| JP | 2012-41038 A | 3/2012 |

* cited by examiner

TARGET STEADY-STATE DRIVE TORQUE MAP

MG ASSIST TORQUE MAP

MAP A (OFFSET OPENING ANGLE [deg])

| | VEHICLE SPEED [km/s] | | | |
|---|---|---|---|---|
| | 0 | 10 | 15 | 100 |
| STATE OF BATTERY CHARGE [%] 0 | 6 | 6 | 5 | 5 |
| 30 | 6 | 6 | 5 | 5 |
| 60 | 4 | 4 | 2 | 2 |
| 100 | 4 | 4 | 2 | 2 |

MAP B

| STATE OF BATTERY CHARGE [%] | 20 | 30 | 40 | 100 |
|---|---|---|---|---|
| OFFSET OPENING ANGLE [deg] | 6 | 6 | 5 | 5 |

IMPLEMENTATION TIME (S)

| | | STATE OF BATTERY CHARGE [%] | | | |
|---|---|---|---|---|---|
| | | 30 | 50 | 60 | 80 |
| DEMANDED DRIVE TORQUE [Nm] | 80 | 2 | 2 | 1 | 1 |
| | 100 | 2 | 2 | 1 | 1 |
| | 120 | 0.5 | 0.5 | 0.5 | 0.5 |
| | 140 | 0.5 | 0.5 | 0.5 | 0.5 |

FIG. 16

CONTROL DEVICE FOR HYBRID VEHICLE

CROSS-REFERENCE TO RELATED APPLICATIONS

This application is a U.S. National stage application of International Application No. PCT/JP2013/056127, filed Mar. 6, 2013, which claims priority to Japanese Patent Application No. 2012-056034 filed in Japan on Mar. 13, 2012, the contents of each of which are hereby incorporated herein by reference.

BACKGROUND

1. Field of the Invention

The present invention relates to a control device for a hybrid vehicle, whereby the engine-start condition for initiating mode transition from electric vehicle mode to hybrid vehicle mode can be made to differ depending on the condition.

2. Background Information

In the prior art, when torque demand information reflective of demand by the driver exceeds an engine start line that was set according to vehicle speed, the engine is started to bring about mode transition from electric vehicle mode to hybrid vehicle mode. That is, a zone for travel in electric vehicle mode (hereinafter termed an EV travel zone) is determined according to the magnitude of the engine start line with respect to the torque demand information.

Control devices for a hybrid vehicle which are designed to set the engine start line to a relatively small value to minimize expansion of the EV travel zone when the driver has definite intent to accelerate, while setting the engine start line to a relatively large value to expand the EV travel zone when the driver has tenuous intent to accelerate, are known (see Japanese Laid-Open Patent Application No. 2007-261442, for example).

SUMMARY

However, with the prior art devices, as long as the driver has tenuous intent to accelerate, the engine start line continues to be set to a relatively large value, and an expanded EV travel zone is maintained, whereby "maximum torque during EV," which can be employed while traveling in electric vehicle mode, continues to be set to a large value.

Specifically, when the EV travel zone is expanded and the engine start line value is large, starting of the engine is executed once the torque demand information has reached a large value. Stated another way, motor-driven travel is sustained even when the torque demand information is a large value. It is necessary for the "maximum torque during EV" to be maintained at a large value in order for large values of torque demand information to be satisfied while traveling while driven by the motor. That is, when it is desired to expand the EV travel zone, the "maximum torque during EV" is set to a relatively large value.

When a demand to start the engine is issued in such a case, the motor will output the maximum torque it is capable of outputting in order to meet the required engine-starting torque, which places a high load on the inverter which controls the motor, posing a risk of leading to component failure.

Furthermore, when motor travel is sustained despite the torque demand information reaching a large value, power from the battery is consumed to an excessive extent, the remaining battery capacity becomes low, and it is conceivable that the frequency of transition to forced generation mode and consequent starting of the engine starting could be increased thereby. Such frequent starting of the engine may possibly result in poor fuel economy.

With the foregoing in view, it is an object of the present invention to provide a control device for a hybrid vehicle, whereby increased load on the motor and excessive consumption of battery power associated with expansion of the EV travel zone can be minimized.

In order to achieve the aforedescribed object, the control device for a hybrid vehicle according to the present invention is provided with engine-start-condition-controlling means or device in a hybrid vehicle equipped with an engine, a motor, and mode switching or device.

The motor is furnished to the drive system leading from an engine to a drive wheel, and performs starting of the engine and driving of the drive wheel.

The mode switching means is furnished to a linking part of the engine and the motor, and when a preset engine-start condition is met, brings about a hybrid vehicle mode in which rotation of the motor is transmitted to the engine, and the engine is started so that the engine and the motor serve as drive sources; and when a preset engine-stop condition is met, stops the engine and brings about an electric vehicle mode in which the motor serves as the drive source.

When the vehicle is traveling in the electric vehicle mode, and an EV travel zone expansion condition is met, causes the engine-start condition to be changed, for a prescribed time after the EV travel zone expansion condition has been met, from a baseline start condition that prevails when the EV travel zone expansion condition is not met to an expansion engine-start condition for expanding the travel zone in the electric vehicle mode, the EV travel zone expansion condition being set on the basis of vehicle speed and torque demand information reflective of demand by a driver, and the travel zone in the electric vehicle mode being expanded under the EV travel zone expansion condition.

Accordingly, when the EV travel zone expansion condition is met, for a prescribed time after this EV travel zone expansion condition has been met, the engine-start condition is set to the baseline start condition; and thereafter set to the expanded the engine-start condition for expanding the travel zone in the electric vehicle mode.

Consequently, the time for which the expanded the engine-start condition is implemented as the engine-start condition is limited, and the time for which the maximum motor travel torque which can be employed for traveling while in electric vehicle mode is set to a large value can be limited as well.

In so doing, there are fewer instances in which, due to the maximum motor travel torque having been set to a large value, the maximum torque of which the motor is capable of outputting is output to meet the required engine-starting torque when an engine start demand occurs, and the load on the inverter can be reduced. Additionally, because there are fewer instances in which motor travel persists despite the torque demand information reaching a large value, excessive consumption of battery power can be minimized.

As a result, increased load on the motor and excessive consumption of battery power associated with expansion of the EV travel zone can be minimized.

BRIEF DESCRIPTION OF THE DRAWINGS

Referring now to the attached drawings which form a part of this original disclosure.

FIG. 16 is a diagram showing an example of a map for setting the expansion start line implementation time.

DETAILED DESCRIPTION OF EMBODIMENTS

Figure 1:
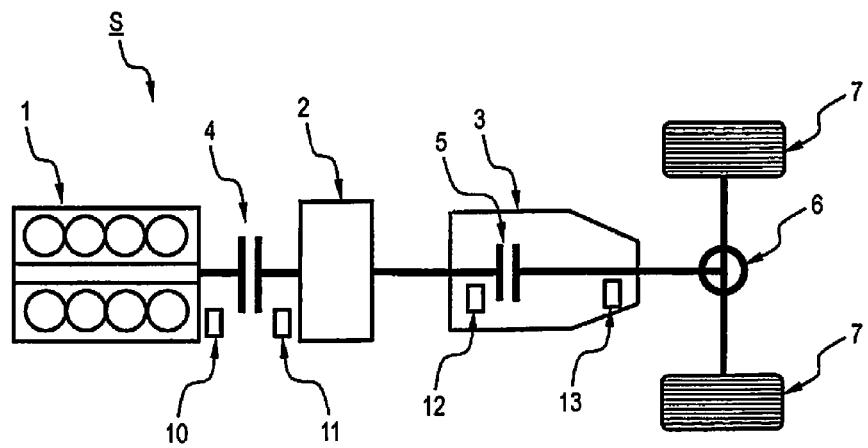
FIG. 1 is a powertrain configuration diagram showing a powertrain of a hybrid vehicle in which the control device for a hybrid vehicle according a first embodiment is implemented.

The embodiments of the control device for a hybrid vehicle according to the present invention will be described below, on the basis of a first embodiment and a second embodiment shown in the drawings.

Embodiment 1

The configuration shall be described first.

FIG. 1 is a powertrain system configuration diagram showing a powertrain of a hybrid vehicle in which the control device for a hybrid vehicle according a first embodiment is implemented. The following description of the powertrain is based on FIG. 1.

As shown in FIG. 1, the powertrain system of the hybrid vehicle S of the first embodiment is equipped with an engine 1, a motor-generator 2 (motor), an automatic transmission 3, a first clutch (mode switching means) 4, a second clutch 5, a differential gear 6, and tires (drive wheels) 7, 7.

The hybrid vehicle S of the first embodiment has a powertrain system configuration equipped with the engine and the one motor/two clutches, and has as driving modes an "HEV mode" in which the first clutch 4 is engaged, an "EV mode" in which the first clutch 4 is released, and a "WSC mode" in which the second clutch 5 is slip-engaged during travel.

The engine 1 is linked at the output shaft thereof to the input shaft of the motor-generated 2 (abbreviated MG) via the variable-torque capacity first clutch 4 (abbreviated CL1).

The motor-generator 2 is linked at the output shaft thereof to the input shaft of the automatic transmission 3 (abbreviated AT).

The tires 7, 7 are linked to the output shaft of the automatic transmission 3 via the differential gear 6.

The second clutch 5 (abbreviated CL2) employs one of a number of variable-torque capacity clutch-brake engagement elements which are responsible for differing transmission of power in the transmission, according to the state of shifting of the automatic transmission 3. In so doing, the automatic transmission 3 outputs to the tires 7, 7 a combination of power from the engine 1, input via the first clutch 4, and power input from the motor-generator 2.

As the first clutch 4 and the second clutch 5 there may be employed, for example, multi-plate wet clutches that can continuously control oil flow and hydraulic pressure of a proportional solenoid, or the like.

The powertrain system is further equipped with an engine revolution sensor 10 for detecting the number of revolutions of the engine 1, an MG revolution sensor 11 for detecting the number of revolutions of the motor-generator 2, an AT input revolution sensor 12 for detecting the number of revolutions of the input shaft of the automatic transmission 3, and an AT output revolution sensor 13 for detecting the number of revolutions of the output shaft of the automatic transmission 3.

Figure 2:
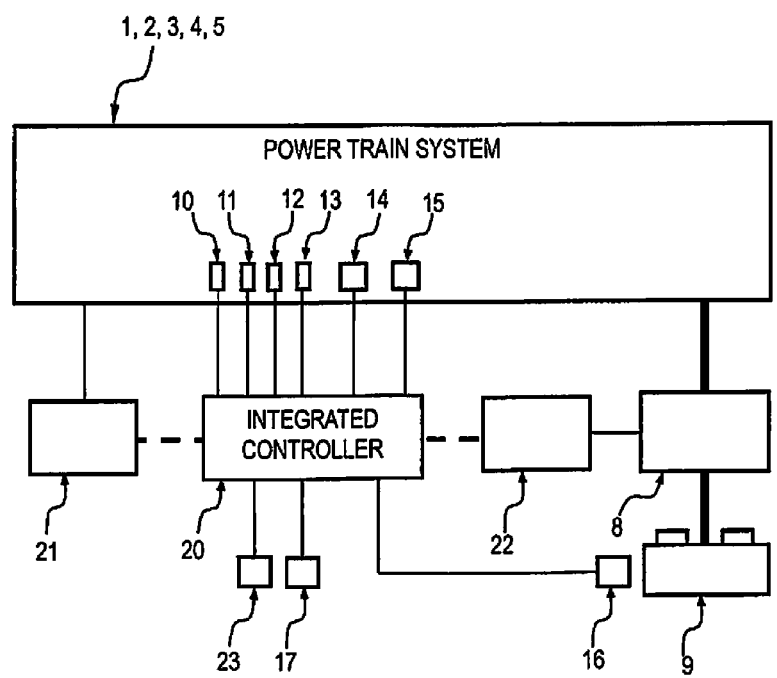
FIG. 2 is a control system configuration diagram showing a control system of a hybrid vehicle in which the control device of the first embodiment is implemented.

FIG. 2 is a control system configuration diagram showing a control system of the hybrid vehicle in which the control device of the first embodiment is implemented. The following description of the control system is based in FIG. 2.

As shown in FIG. 2, the control system of the first embodiment is equipped with an integrated controller 20, an engine controller 21, a motor controller 22, an inverter 8, a battery 9, a CL1 solenoid valve 14, a CL2 solenoid valve 15, an accelerator position sensor 17, a battery temperature sensor 23, and an SOC sensor 16.

The integrated controller 20 performs integrated control of the operating points of the constituent elements of the powertrain system. The integrated controller 20 selects a driving mode in which the drive power desired by the driver can be achieved, according to the accelerator position APO, the state of battery charge SOC, and the vehicle speed VSP (proportional to the number of revolutions of the input shaft of the automatic transmission). A target MG torque or target MG number of revolutions instruction is then issued to the motor controller 22, a target engine torque instruction is issued to the engine controller 21, and drive signal instructions are issued to the CL1 and CL2 solenoid valves 14, 15.

The engine controller 21 controls the engine 1. The motor controller 22 controls the motor-generator 2. The inverter 8 drives the motor-generator 2. The battery 9 stores electrical energy. The CL1 solenoid valve 14 controls the hydraulic pressure of the first clutch 4. The CL2 solenoid valve 15 controls the hydraulic pressure of the second clutch 5. The accelerator position sensor 17 detects the accelerator position APO. The battery temperature sensor 23 detects the temperature of the battery 9. The SOC sensor 16 detects the state of charge of the battery 9.

Figure 3:
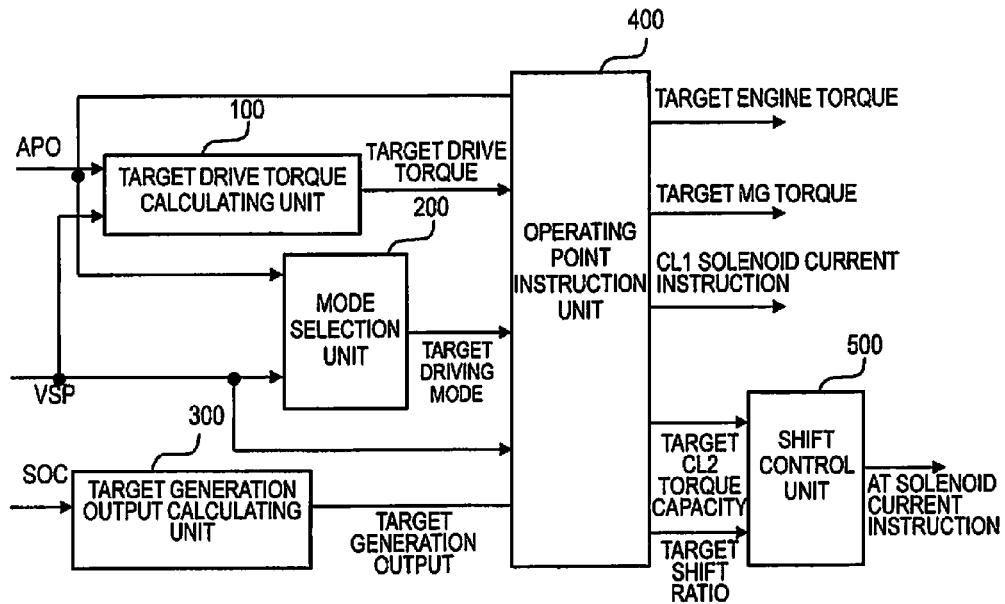
FIG. 3 is a computational block diagram showing an integrated controller in the control device of the first embodiment.

FIG. 3 is a computational block diagram showing the integrated controller in the control device of the first embodiment. The following description of the configuration of the integrated controller 20 is based on FIG. 3.

As shown in FIG. 3, the integrated controller 20 is equipped with a target drive torque calculating unit 100, a mode selection unit 200, a target generation output calculating unit 300, an operating point instruction unit 400, and a shift control unit 500.

Figure 4A:
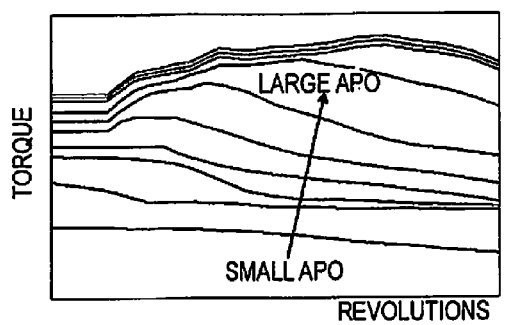
FIG. 4A is a map diagram showing an example of a target steady-state drive torque map employed in the control device of the first embodiment.
Figure 4B:
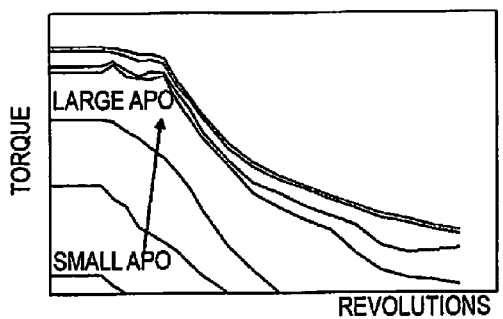
FIG. 4B is a map diagram showing an example of an MG assist torque map employed in the control device of the first embodiment.

Using the target steady-state drive torque map shown in FIG. 4A and the MG assist torque map shown in FIG. 4B, the target drive torque calculating unit 100 calculates a target drive torque (target steady-state drive torque and MG assist torque) from the accelerator position APO and the vehicle speed VSP.

Figure 5:
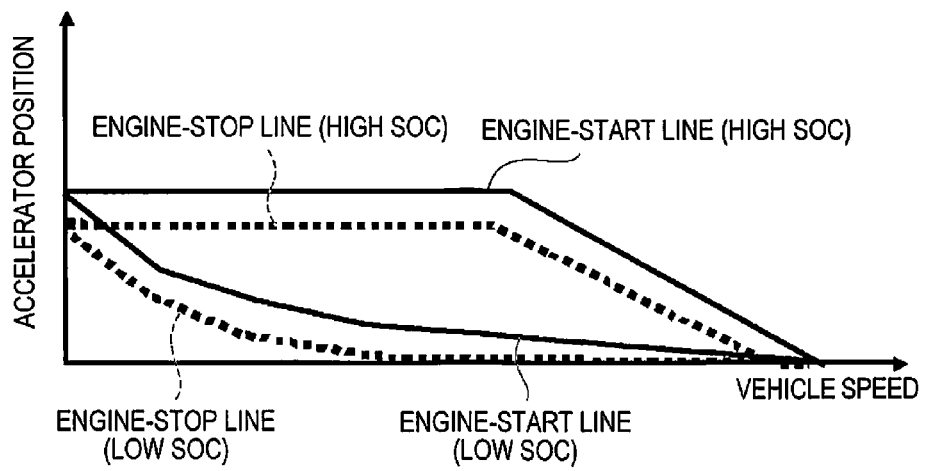
FIG. 5 is a map diagram showing an example of an engine-start/stop line map employed in the control device of the first embodiment.

Using the engine-start/stop line map shown in FIG. 5, in which an accelerator position (torque demand information reflective of demand by the driver) is set for each vehicle speed, the mode selection unit 200 calculates a driving mode (HEV mode, EV mode). That is, during "EV mode," when an engine-start condition is met, the mode selection unit 200 selects as the driving mode the "HEV mode" in which the first clutch 4 is engaged, transmitting rotation of the motor-generator 2 to the engine 1 and starting the engine 1. During "HEV mode," when an engine-stop condition is met, the "EV mode" is selected as the driving mode, stopping the engine 1.

The engine-start condition refers to a state in which, with the "EV mode" selected, the engine start line shown in FIG. 5 exceeds the accelerator position APO. The engine-stop condition refers to a state in which, with the "HEV mode" selected, the engine stop line shown in FIG. 5 is below the accelerator position APO. Specifically, the zone in which the accelerator position APO is below the engine start line is the zone of travel in the "EV mode" (hereinafter termed EV travel mode). The zone in which the accelerator position APO is above the engine stop line is the zone of travel in the "HEV mode" (hereinafter termed HEV travel mode).

The engine start lines and the engine stop lines are set so as to have the characteristic of declining towards the direction of smaller accelerator positions APO, at lower states of charge SOC of the battery, as represented by the characteristics of engine start lines (SOC high, SOC low) and engine stop lines (SOC high, SOC low). The engine stop lines are set by subtracting prescribed hysteresis from the engine start lines, and are set to smaller values than the engine start lines.

Here, the engine starting process involves controlling the torque capacity of the second clutch 5 such that the second clutch 5 slips at the point in time that, with the "EV mode" selected, the engine start line shown in FIG. 5 rises above the accelerator position APO. After it has been determined that the second clutch 5 has started to slip, the first clutch 4 starts to engage, boosting the engine revolutions. Once the engine revolutions have reached the number of revolutions at which initial explosion becomes possible, the engine 1 combusts, and the first clutch 4 becomes fully engaged once the number of revolutions of the motor and the number of revolutions of the engine are in close approximation. Thereafter, the second clutch 5 is locked up, transitioning to "HEV mode."

Figure 6:
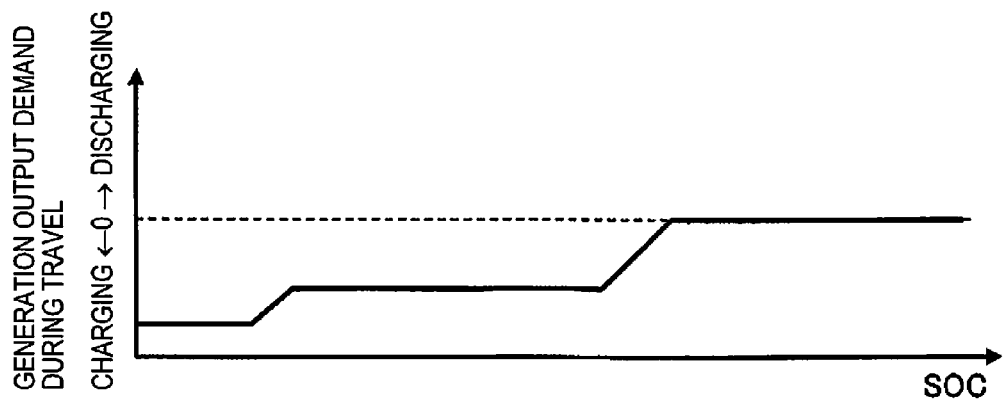
FIG. 6 is a characteristic diagram showing an example of generation output demand during travel, plotted against the state of charge SOC of the battery employed in the control device of the first embodiment.
Figure 7:
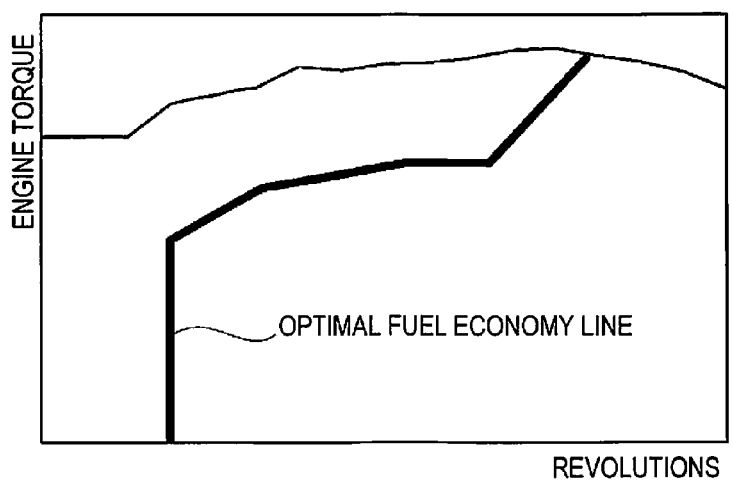
FIG. 7 is a characteristic diagram showing an example of an optimal fuel economy line of the engine employed in the control device of the first embodiment.

Using the map of generation output demand during travel shown in FIG. 6, the target generation output calculating unit 300 calculates a target generation output, from the state of battery charge SOC. The output necessary to increase the engine torque from the current operating point to the optimal fuel economy line shown in FIG. 7 is calculated as well, and this is compared to the aforementioned target generation output, adding the smaller output as demanded output, to the engine output.

The accelerator position APO, the target drive torque, the target driving mode, the vehicle speed VSP, and the target generation output are input to the operating point instruction unit 400. Using this input information as an operating point attainment target, transient target engine torque, target MG torque, target CL2 torque capacity, target gear ratio, and a CL1 solenoid current instruction are calculated.

Figure 8:
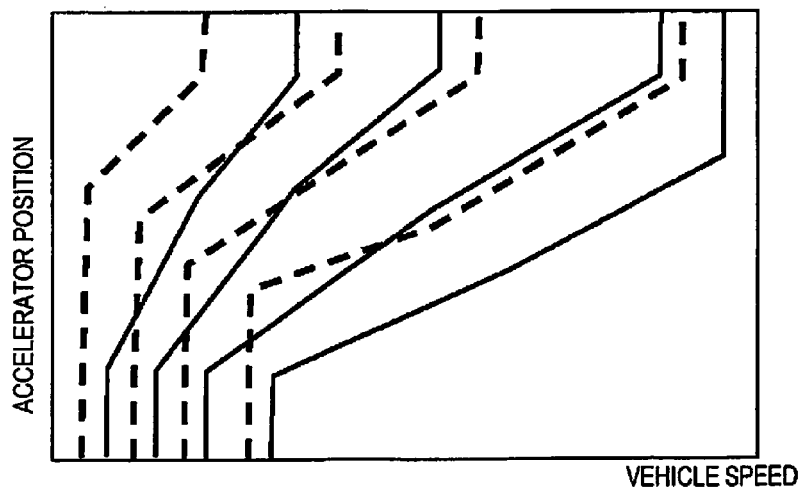
FIG. 8 is a shift-gear map showing an example of shift-gear lines in an automatic transmission employed in the first embodiment.

From the target CL2 torque capacity and the target gear ratio, the shift control unit 500 controls driving of the solenoid valve in the automatic transmission 3, such that these are attained. FIG. 8 shows an example of a shift-gear line map employed in shift control. From the vehicle speed VSP and the accelerator position APO, it is determined how many positions to shift from the current shift position to the next shift position, and when a demand to shift is made, the gearshift clutch is controlled to bring about shifting.

In the one motor/two clutch hybrid vehicle S, with the "EV mode" selected, it is necessary to ensure engine-starting torque in preparation for starting of the engine. Therefore, during travel in the "EV mode," the upper limit of motor torque that can be employed for travel (hereinafter termed EV upper limit torque) is limited to the value of the maximum torque outputtable by the motor-generator 2, minus the engine-starting torque.

Here, the EV upper limit torque is set with reference to the magnitude of the engine start line. Specifically, the EV upper limit torque is set to a large value when the engine start line is a large value, or the EV upper limit torque is set to a small value when the engine start line is a small value.

Figure 10:
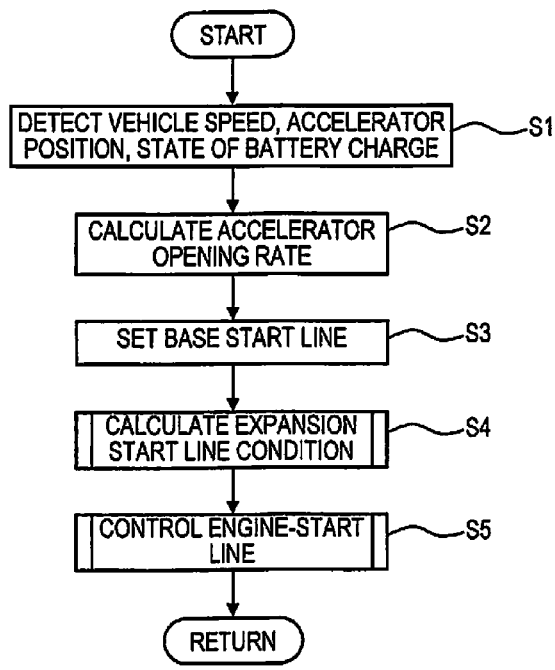
FIG. 10 is a flowchart showing the flow of an engine-start condition setting process executed by the integrated controller of the first embodiment.

FIG. 10 is a flowchart showing the flow of an engine-start condition setting process executed by the integrated controller of the first embodiment. The steps in FIG. 10 are described below.

In Step S1, the vehicle speed VSP, the accelerator position APO, and the state of battery charge SOC are detected, and the routine advances to Step S2.

Here, the vehicle speed VSP is calculated through multiplication of a preset proportionality coefficient by the number of rotations of the output shaft of the automatic transmission 3 detected by an AT output shaft rotation sensor 13. The accelerator position APO is detected by the accelerator position sensor 17. The state of battery charge SOC is detected by the SOC sensor 16.

In Step S2, following detection of values in Step S1, an accelerator opening rate ΔAPO which represents the rate of change (amount of change), per unit of time, of the accelerator position APO that was detected in Step S1, is calculated, and the routine advances to Step S3.

In Step S3, following calculation of the accelerator opening rate ΔAPO in Step S2, an engine start line to serve as a benchmark in the engine-start/stop line map, that is, a base start line representing an engine-start line for implementation in a baseline engine-start condition (shown by a solid line in FIG. 11) is set, and the routine advances to Step S4.

Here, the base start line varies according to the magnitude of the state of battery charge SOC. Specifically, as shown in FIG. 5, when the state of battery charge SOC is high, the line is set to a relatively large value, whereas when the state of battery charge SOC is low, the line is set to a relatively small value.

A baseline engine-start condition refers to an engine-start condition that prevails when neither an EV travel zone expansion condition nor an EV travel zone contraction condition, discussed below, are met.

In Step S4, following setting of the base start line in Step S3, an expansion start line condition calculation process, described below, is used to set an expansion start line and a contraction start line, as well as to calculate an expansion start line implementation time, whereupon the routine advances to Step S5.

Figure 11:
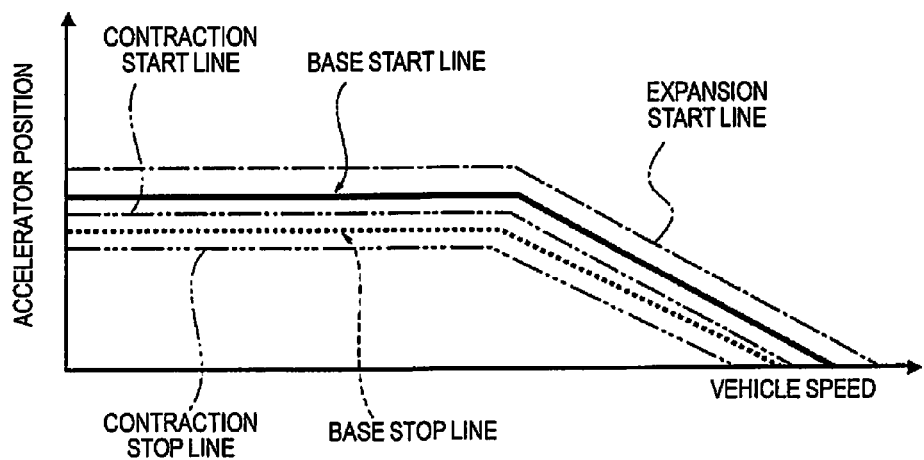
FIG. 11 is a map showing an example of a base start line, an expansion start line, a contraction start line, a base stop line, and a contraction stop line, in an engine-start/stop line map.

Here, an "expansion start line" refers to an engine start line for implementation in an expansion engine-start condition, and is set to a larger value than the base start line, as shown by the single-dot and dash line in FIG. 11. An "expansion engine-start condition" refers to an engine-start condition that prevails when an EV travel zone expansion condition for expanding the EV travel zone, discussed later, is met.

A "contraction start line" refers to an engine start line for implementation in a contraction engine-start condition, and is set to a smaller value than the base start line, as shown by the double-dot and dash line in FIG. 11. A "contraction engine-start condition" refers to an engine-start condition that prevails when an EV travel zone contraction condition for contracting the EV travel zone, discussed later, is met.

In Step S5, following calculation of the expansion start line condition in Step S4, an engine start line control process, discussed below, is used for control of the engine start line implemented during travel in the "EV mode," whereupon the routine advances to RETURN.

Here, "control of the engine start line" refers to control to modify the engine start line implemented as a benchmark for mode transition, doing so according to factors such as the accelerator position APO, the count time, and the like. Specifically, control is performed to set the engine start condition to a baseline engine-start condition, an expansion engine-start condition, or the like.

Figure 12:
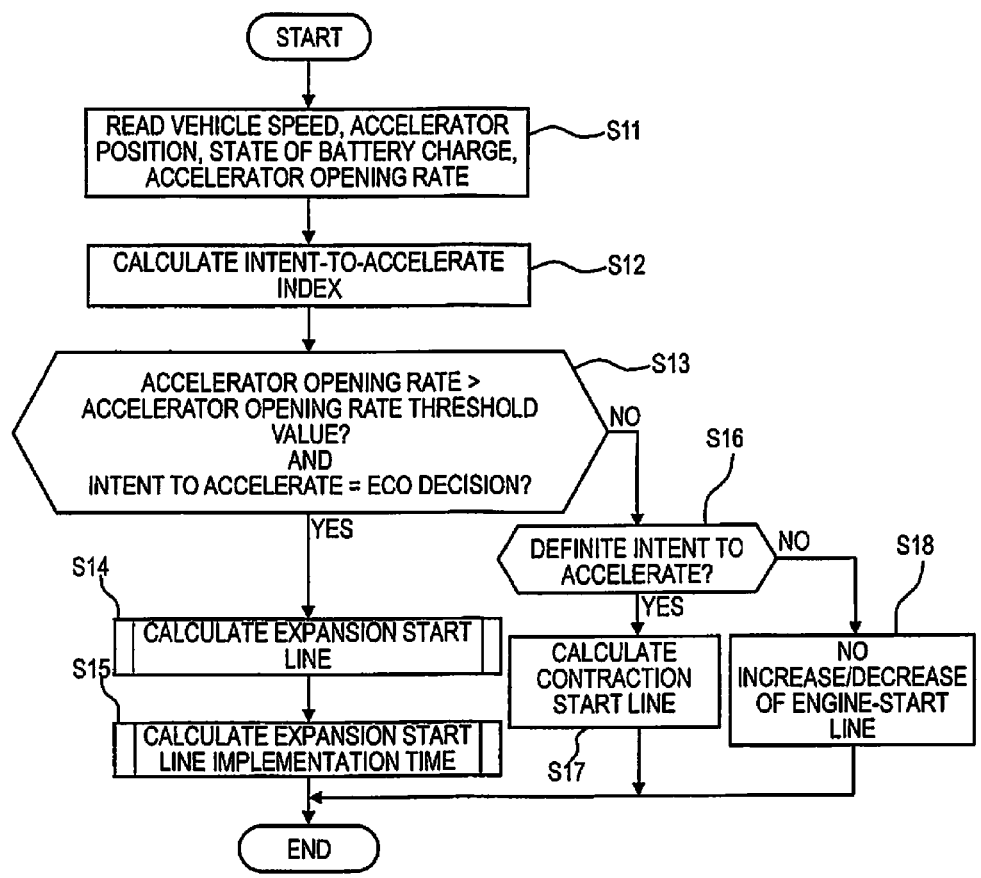
FIG. 12 is a flowchart showing the flow of an expansion start line condition calculation process executed by the integrated controller of the first embodiment.

FIG. 12 is a flowchart showing the flow of an expansion start line condition calculation process executed by the integrated controller of the first embodiment. This expansion start line condition calculation process is a process executed in Step S4 of the engine-start condition setting process. The steps of FIG. 12 are described below.

In Step S11, the vehicle speed VSP, the accelerator position APO, the state of battery charge SOC, and the accelerator opening rate ΔAPO which were detected or calculated in the engine-start condition setting process shown in FIG. 10, are read, whereupon the routine advances to Step S12.

In Step S12, following reading of the values in Step S11, an intent-to-accelerate index is calculated, and the routine advances to Step S13.

Here, the "intent-to-accelerate index" refers to an index employed to make a determination as to the driver's intent to accelerate, and is derived through weighted averaging of information such as longitudinal and lateral acceleration acting on the vehicle, the accelerator position APO, the grade of the road being traveled, and the like.

Determination of a larger intent-to-accelerate index indicates greater intent to accelerate on the part of the driver.

In Step S13, following calculation of the intent-to-accelerate index in Step S12, a determination is made as to whether the accelerator opening rate ΔAPO that was read in Step S11 has risen above a preset accelerator opening rate threshold value ΔAPOth, and whether the driver's intent-to-accelerate represents an ECO decision. In the event of a YES determination (ΔAPO>ΔAPOth and intent-to-accelerate=ECO decision), the routine advances to Step S14. In the event of a NO determination (ΔAPO≤ΔAPOth and intent-to-accelerate≠ECO decision), the routine advances to Step S16.

Here, the "accelerator opening rate threshold value ΔAPOth" is a rate of change (rate of depression of the accelerator) from which it can be reliably determined that the accelerator position APO has risen above the engine start line. In cases in which the accelerator is depressed fairly slowly, normally, the vehicle speed and accelerator position will already be fairly high values, and it can be determined that there is a low likelihood of sudden transition to "EV mode" after starting of the engine. In such cases, an expansion start line is not set.

"Intent-to-accelerate representing an ECO decision" refers to a case in which the intent-to-accelerate index calculated in Step S12 is below a preset intent-to-accelerate threshold value, indicating tenuous intent to accelerate on the part of the driver.

In Step S14, following a determination in Step S13 that ΔAPO>ΔAPOth and intent-to-accelerate=ECO decision, the expansion start line calculation process discussed below is employed to calculate an expansion start line, and the routine advances to Step S15.

Here, "calculation of an expansion start line" refers in specific terms to calculating an amount of expansion, with respect to the base start line, during expansion of the engine start line (adoption of a larger value with respect to the base start line), and setting an expansion start line.

In Step S15, following calculation of an expansion start line in Step S14, the expansion start line implementation time calculation process discussed below is used to calculate a time at which to implement the expansion start line that was set in Step S14, whereupon the routine advances to END.

In Step S16, following a determination in Step S13 that ($\Delta$APO$\leq\Delta$APOth and intent-to-accelerate$\neq$ECO decision, a determination is made as to whether there is definite intent to accelerate on the part of the driver. In the case of a YES determination (intent to accelerate=definite), the routine advances to Step S17. In the case of a NO determination (intent to accelerate$\neq$definite), the routine advances to Step S18.

Here, a case of definite intent to accelerate refers to a case in which the intent-to-accelerate index calculated in Step S12 is greater than a preset intent-to-accelerate upper limit threshold value.

The condition set in this Step S18 is an "EV travel zone contraction condition" employed when contracting the EV travel zone.

In Step S17, following a determination in Step S16 that intent to accelerate=definite, a contraction start line is calculated, and the routine advances to END.

Here, "calculation of a contraction start line" refers in specific terms to calculating an amount of contraction, with respect to the base start line, during contraction of the engine start line (adoption of a smaller value with respect to the base start line), and setting a contraction start line. That is, after deciding upon an offset opening angle (amount of contraction with respect to the base start line) on the basis of a preset map, the base start line is offset in the direction of a smaller value, by the offset opening angle so decided.

In Step S18, following a determination in Step S16 that intent to accelerate$\neq$definite, the base start line is neither increased nor decreased, a setting to continue to employ the base start line as the engine start line is performed, and the routine advances to END.

Figure 13:
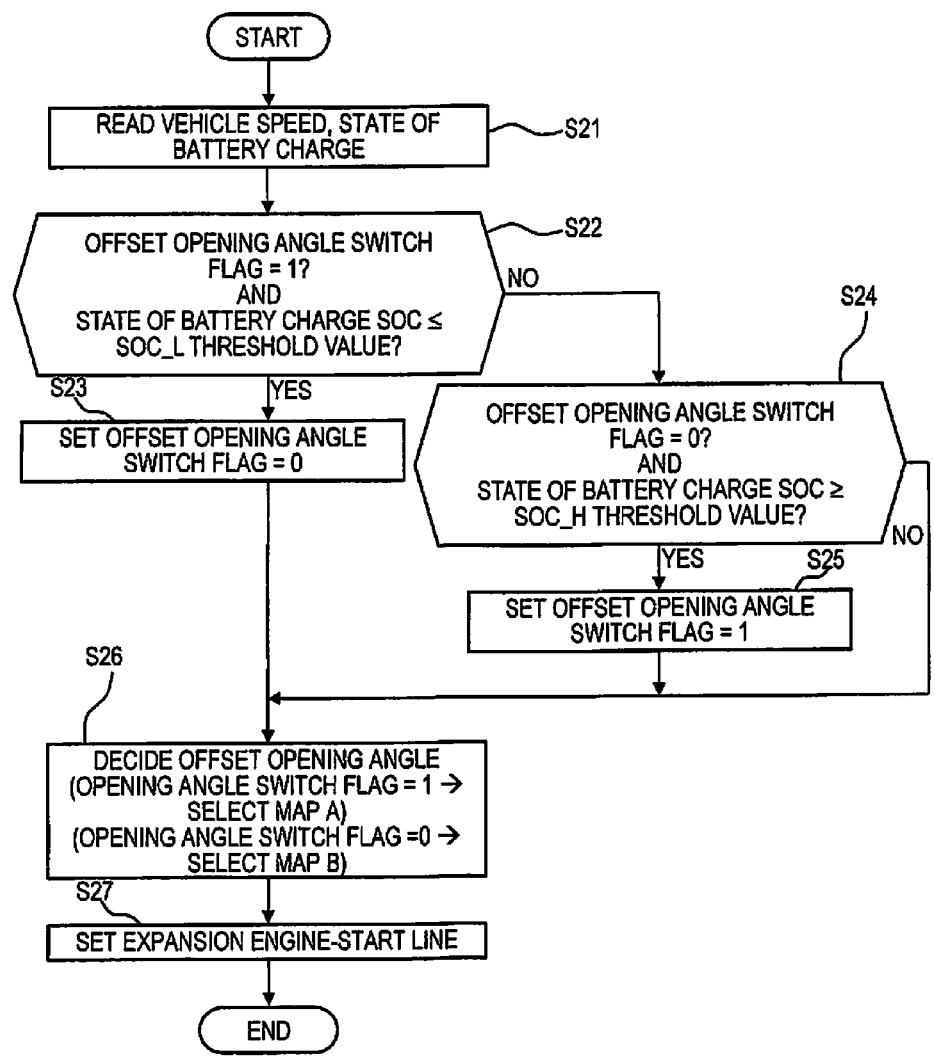
FIG. 13 is a flowchart showing the flow of an expansion start line calculation process executed by the integrated controller of the first embodiment.

FIG. 13 is a flowchart showing the flow of an expansion start line calculation process executed by the integrated controller of the first embodiment. This expansion start line calculation process is a process executed in Step S14 of the expansion start line condition calculation process. The steps of FIG. 13 are described below.

In Step S21, the vehicle speed VSP, the accelerator position APO and the state of battery charge SOC which were detected in the engine-start condition setting process shown in FIG. 10 are read, whereupon the routine advances to Step S22.

In Step S22, following reading of the values in Step S21, an offset opening angle switching flag is set to "1," and a determination is made as to whether the state of battery charge SOC is equal to or less than a preset SOC_L threshold value. In the case of a YES determination (flag=1 and SOC$\leq$SOC_L threshold value), the routine advances to Step S23. In the case of a NO determination (flag$\neq$1 or SOC>SOC_L threshold value), the routine advances to Step S24. Here, the "SOC_L threshold value" is a value about 5% higher than a generation threshold value at which travel in the "EV mode" is disabled, forcing generation.

In Step S23, following a determination in Step S22 of flag=1 and SOC$\leq$SOC_L threshold value, the offset opening angle switching flag is set to "0," and the routine advances to Step S26.

In Step S24, following a determination in Step S22 of flag$\neq$1 or SOC>SOC_L threshold value, a determination is made as to whether the offset opening angle switching flag is set to "0," and whether the state of battery charge SOC is equal to or greater than a preset SOC_H threshold value. In the case of a YES determination (flag=0 and SOC$\geq$SOC_H threshold value), the routine advances to Step S25. In the case of a NO determination (flag$\neq$0 or SOC<SOC_H threshold value), the routine advances to Step S26.

Here, the "SOC_H threshold value" is a value about 5% lower than the control center state of battery charge. The setting is such that SOC_L threshold value<SOC_H threshold value.

In Step S25, following a determination in Step S24 of flag=0 and SOC$\geq$SOC_H threshold value, the offset opening angle switching flag is set to "1," and the routine advances to Step S26.

In Step S26, following setting of the offset opening angle in Step S23 and Step S25, or a determination in Step S24 of flag$\neq$0 or SOC<SOC_H threshold value, an offset opening angle is decided upon, and the routine advances to Step S27.

Here, an "offset opening angle" refers to an amount of expansion used when setting the engine start line to a larger value than the base start line. In deciding upon this offset opening angle, a map is selected according to the current setting of the offset opening angle flag, and a decision is made on the basis of this map.

Figures 14A, 14B, 15:
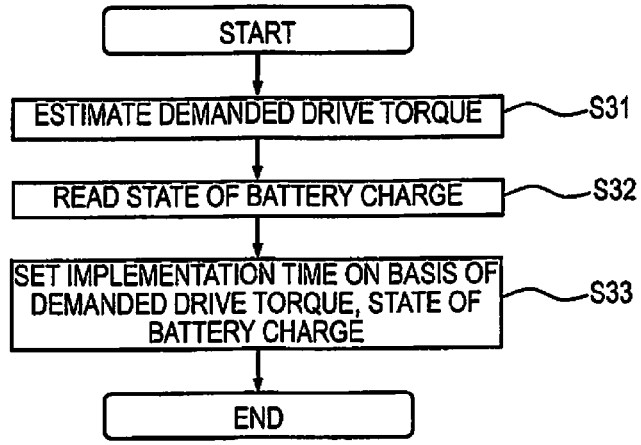
FIG. 14A is a diagram showing a map A as an example of a map for setting engine start line expanded quantity.
FIG. 14B is a diagram showing a map B as another example of a map for setting engine start line expanded quantity.
FIG. 15 is a flowchart showing the flow of an expansion start line implementation time calculation process executed by the integrated controller of the first embodiment.

In a case in which the offset opening angle flag has been set to "1," map A shown in FIG. 14A is selected, and an offset opening angle is decided upon on the basis of the vehicle speed VSP and state of battery charge SOC which were read in Step S21. This map A is a map in which the offset opening angle is smaller in association with higher vehicle speed VSP and state of battery charge SOC.

In a case in which the offset opening angle flag has been set to "0," map B shown in FIG. 14B is selected, and an offset opening angle is decided upon on the basis of the state of battery charge SOC which was read in Step S21. This map B is a map in which the offset opening angle is smaller in association with higher state of battery charge SOC, regardless of the vehicle speed VSP.

In Step S27, following the decision of an offset opening angle in Step S26, the base start line is offset in a direction of larger values by the offset opening angle decided upon, to thereby set an expansion start line, whereupon the routine advances to END. An expansion start line is set thereby.

FIG. 15 is a flowchart showing the flow of an expansion start line implementation time calculation process executed by the integrated controller of the first embodiment. This expansion start line implementation time calculation process is a process executed in Step S15 of the expansion start line condition calculation process. The steps of FIG. 15 are described below.

In Step S31, on the basis of the accelerator position APO detected in the engine-start condition setting process shown in FIG. 10, the drive torque demanded by the driver is estimated, and the routine advances to Step S32.

Here, because the demand for drive torque is proportional to the accelerator position APO, a predetermined proportional coefficient is multiplied by the accelerator position APO.

In Step S32, following estimation of demand for drive torque in Step S31, the state of battery charge SOC detected in the engine start line control process shown in FIG. 10 is read, and the routine advances to Step S33.

In Step S33, after reading the state of battery charge SOC in Step S32, a time for implementing the expansion start line is set on the basis of the state of battery charge SOC and the demand for drive torque estimated in Step S31, and of the implementation time setting map shown in FIG. 16, whereupon the routine advances to END.

Here, the time for implementing the expansion start line refers to the time for actual implementation of the expansion start line, in a case in which, during travel in the "EV mode," a condition for implementing the expansion start line is met. That is, the expansion start line is implemented exclusively during an unchanging time interval, when a condition for implementation thereof is met.

The implementation time setting map shown in FIG. 16 is a map in which implementation time is shorter in association with a higher state of battery charge SOC and a higher demand for drive torque.

Figure 17:
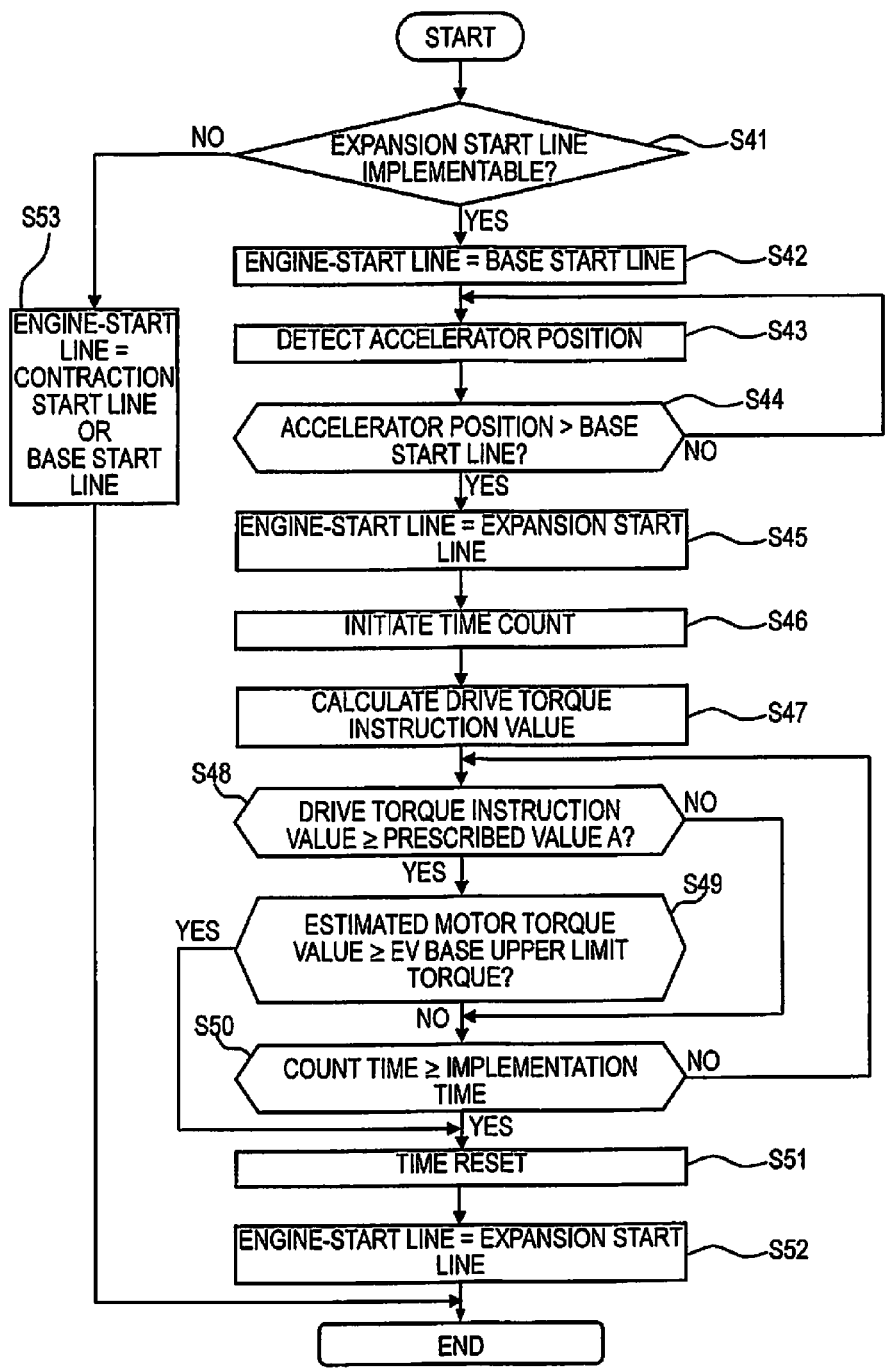
FIG. 17 is a flowchart showing an engine start control process executed by the integrated controller of the first embodiment.

FIG. 17 is flowchart showing an engine start control process executed by the integrated controller of the first embodiment. This engine start line control process is a process executed in Step S5 of the engine-start condition setting process. The steps of FIG. 17 are described below.

In Step S41, a determination is made as to whether a condition for implementation of an expansion start line has been met. In the case of a YES determination (the condition is met), the routine advances to Step S42. In the case of a NO determination (the condition is not met), the routine advances to Step S53.

Here, the "condition for implementation of an expansion start line" refers to one stipulating that the accelerator opening rate ΔAPO has risen above the preset accelerator opening rate threshold value ΔAPOth, and that the driver's intent-to-accelerate represents an ECO decision. That is, the condition is identical to that in Step S13 in the expansion start line condition calculation process shown in FIG. 12.

In Step S42, following a determination in Step S41 that the condition for implementation is met, the engine start line is set to the base start line that was set in Step S3 of the engine-start condition setting process shown in FIG. 10, and the routine advances to Step S43. In so doing, the engine-start condition is initially set to the baseline engine-start condition.

In Step S43, following setting of the base start line in Step S42, the accelerator position APO is detected, and the routine advances to Step S44.

In Step S44, after detecting the accelerator position APO in Step S43, a determination is made as to whether the detected accelerator position APO has exceeded the base start line. In the case of a YES determination (APO>base start line), the routine advances to Step S45. In the case of a NO determination (APO≤base start line), the routine returns to Step S43.

Here, the determination in Step S44 that "the detected accelerator position APO exceeds the base start line" and the determination in Step S41 that "the condition for implementation of an expansion start line is met" constitute "EV travel zone extension conditions" which are employed when extending the EV travel zone.

In Step S45, following a determination in Step S44 of APO>base start line, the engine start line is set to the expansion start line that was set in the expansion start line calculation process shown in FIG. 13, and the routine advances to Step S46. In so doing, the engine-start condition is changed from the baseline engine-start condition to the expansion engine-start condition.

In Step S46, following setting of the expansion start line in Step S45, measurement of time (time count) from implementation of the expansion start line is initiated, and the routine advances to Step S47.

In Step S47, following initiation of the time count in Step S46, a drive torque instruction value to the motor-generator 2 is calculated, and the routine advances to Step S48.

Here, the drive torque instruction value is calculated, for example, by multiplying a prescribed coefficient by the accelerator position, or the like.

In Step S48, following calculation of the drive torque instruction value in Step S47, a determination is made as to whether the calculated drive torque instruction value is equal to or greater than a preset prescribed value A (torque demand threshold value). In the case of a YES determination (instruction value≥prescribed value A), the routine advances to Step S49. In the case of a NO determination (instruction value<prescribed value A), the routine advances to Step S50.

Here, the "prescribed value A" is set to a value such that a bump in drive power is allowed to occur during transition to "HEV mode."

Specifically, when the engine start line is expanded beyond the base start line, initiation of starting of the engine is delayed, in order to minimize starting of the engine in cases in which the accelerator is inadvertently depressed during acceleration but immediately released thereafter. At this time, the motor torque during travel in the "EV mode" is limited to the EV upper limit torque, and therefore a bump in drive power occurs during the transition to the "HEV mode." For this reason, the bump in drive power can be reduced by transitioning to the "HEV mode" at the point in time that the drive torque instruction value (torque demand) has reached a fairly large value. That is, by setting this "prescribed value A" to a value such that a drive power bump is allowed during transition to "HEV mode," occurrence of a bump in drive power can be minimized.

In Step S49, following a determination of instruction value≥prescribed value A in Step S48, a determination is made as to whether an estimated motor torque value is equal to or greater than a preset EV base upper limit torque. In the case of a YES determination (estimated torque value≥maximum base torque), the routine advances to Step S51. In the case of a NO determination (estimated torque value<maximum base torque), the routine advances to Step S50.

The estimated motor torque value is calculated on the basis of the target MG torque instructed by the motor controller 22, for example.

The "EV base upper limit torque" refers to the upper limit value of motor travel torque that can be employed for travel in the "EV mode" when the engine-start line has been set to the base start line.

In Step S50, following either a determination of instruction value<prescribed value A in Step S48, or a determination of estimated torque value<base upper limit torque in Step S49, a determination is made as to whether the measurement of time (time count) initiated in Step S46 is equal to or greater than the expansion start line implementation time which was set in the expansion start line implementation time calculation process shown in FIG. 15. In the case of a YES determination (count time≥implementation time), the routine advances to Step S51. In the case of a NO determination (count time<implementation time), the routine returns to Step S48.

In Step S51, following either a determination of estimated torque value≥base upper limit torque in Step S49, or a determination of count time≥implementation time in Step S50, the measurement of time (time count) initiated in Step S46 is reset, and the routine advances to Step S52.

In Step S52, following the time reset in Step S51, the engine-start line is set to the base start line that was set Step S3 of the engine-start condition setting process shown in FIG. 10, and the routine advances to END. In so doing, the engine-start condition is changed back to the baseline engine-start condition.

In Step S53, following a determination in Step S41 that the implementation condition is not met, either a contraction start line, or the base start line, is implemented as the engine-start line, and the routine advances to END.

Here, cases in which a contraction start line is implemented correspond to cases in which the driver is determined to have a relatively definite demand to accelerate. On the other hand, cases in which the base start line is implemented correspond to cases in which the expansion start line implementation condition is not met, but the driver lacks a definite demand to accelerate.

Figure 18:
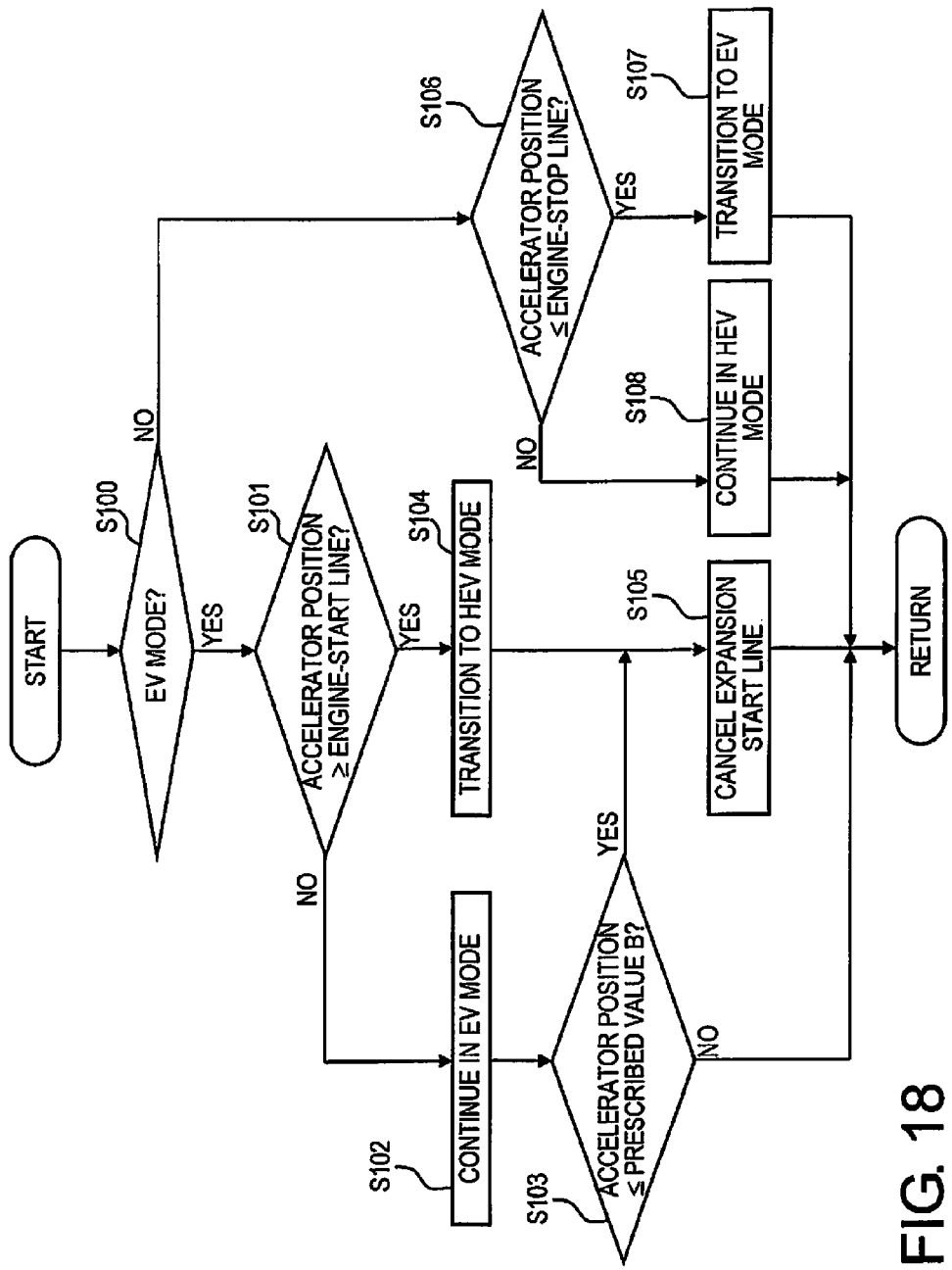
FIG. 18 is a flowchart showing a mode control process executed by the integrated controller of the first embodiment.

FIG. 18 is a flowchart showing the flow of a mode control process executed by the integrated controller of the first embodiment. The steps of FIG. 18 are described below.

In Step S100, a determination is made as to whether the driving mode calculated in the mode selection unit 200 is the "EV mode." In the case of a YES determination (EV mode), the routine advances to Step S101. In the case of a NO determination (HEV mode), the routine advances to Step S106.

In Step S101, following a determination of EV mode in Step S100, a determination is made as to whether the accelerator position APO is equal to or greater than the engine-start line. In the case of a YES determination (APO≥engine-start line), the routine advances to Step S104. In the case of a NO determination (APO<engine-start line), the routine advances to Step S102.

The engine-start line at this time has been set by the engine-start condition setting process shown in FIG. 10.

In Step S102, following a determination of APO<engine-start line in Step S101, the driving mode continues in the "EV mode" state, and the routine advances to Step S103.

In Step S103, following continuation of the EV mode in Step S102, a determination is made as to whether the accelerator position APO is equal to or less than a preset prescribed value B. In the case of a YES determination (APO≤prescribed value B), the routine advances to Step S105. In the case of a NO determination (APO>prescribed value B), the routine advances to RETURN.

Here, the "prescribed value B" refers to a lower limit threshold value employed in cases in which the accelerator is tenuously depressed, to the extent that it is not possible to determine whether or not to continue the current mode of travel.

In Step S104, following a determination of APO≥engine-start line in Step S101, an engine-starting process is performed, the driving mode transitions to the "HEV mode," and the routine advances to Step S105.

In Step S105, following either a determination of APO≤prescribed value B in Step S103 or a determination to transition to the HEV mode in Step S104, the expansion start line that was calculated for a case of expansion of the engine-start line is canceled, and the routine advances to RETURN.

Here, "cancellation of the engine-start line" refers to resetting of the expansion start line that was set in Step S14 of the expansion start line condition calculation process shown in FIG. 12.

In Step S106, following a determination of the HEV mode in Step S100, a determination is made as to whether the accelerator position APO is equal to or less than engine-stop line. In the case of YES determination (APO≤engine-stop line), the routine advances to Step S107. In the case of NO determination (APO>engine-stop line), the routine advances to Step S108.

At this time, in a case of having transitioned to the "HEV mode" due to the accelerator position APO rising above a base start line or an expansion start line, a base stop line is implemented as the engine-stop line. On other hand, in a case of having transitioned to the "HEV mode" due to the accelerator position APO rising above a contraction start line, a contraction stop line is implemented as the engine-stop line.

Here, a "base stop line" is an engine-stop line serving as a benchmark in the engine-start/stop line map, and as shown by the broken line in FIG. 11, is set to value calculated by subtracting preset hysteresis from the base start line. As shown by the triple-dot and dash line in FIG. 11, the "contraction stop line" is set to value calculated by subtracting preset hysteresis from a contraction start line.

In Step S107, following a determination of APO≤engine-stop line in Step S106, an engine-stop process is performed, the driving mode is transitioned to the "EV mode," and the routine advances to RETURN.

In Step S108, following a determination of APO>engine-stop line in Step S106, the driving mode continues in the "HEV mode" state, and the routine advances to RETURN.

Next, actions will be described.

Firstly, "action to transition driving mode in a hybrid vehicle" will be described. This will be followed by separate descriptions of actions in the hybrid vehicle control device of the first embodiment, namely, an "action to expand the engine-start line," an "action to contract the engine-start line," and an "action to maintain the engine-start line at base."

Action to Transition Driving Mode in a Hybrid Vehicle

During travel by the hybrid vehicle S, the mode selection unit 200 of the integrated controller 20 calculates a driving mode, doing so on the basis of the accelerator position APO and, for example, the engine-start/stop line map shown in FIG. 5.

For example, when traveling in the "EV mode," the routine proceeds from Step S100 to Step S101 in the flowchart shown in FIG. 18, whereupon in the event that the accelerator position APO is below the engine-start line, and the engine-start condition is not met, the routine proceeds to Step S102, and continues in the "EV mode." In the event that the accelerator position APO is equal to or greater than the engine-start line, and the engine-start condition is met, the routine proceeds to Step S104, and transitions to the "HEY mode."

Here, while continuing in the "EV mode," in the event that the accelerator position APO reaches a value equal to or less than the prescribed value B, the routine proceeds from Step S103 to Step S105, whereupon the expansion start line that was previously set as the engine-start line is canceled.

In the case of transitioning to the "HEV mode" as well, the routine proceeds to Step S105, whereupon the expansion start line that was previously set as the engine-start line is canceled.

In so doing, during travel in the "EV mode," the expansion start line is reset each time that an EV travel zone expansion condition is met. For this reason, the expansion start lines can be set according to the state of travel at that time, and expansion start lines can be set to match the state of travel.

When traveling in the "HEV mode," in the flowchart shown in FIG. 18, the routine proceeds from Step S100 to Step S106, whereupon in the event that the accelerator position APO rises above the engine-stop line, the routine proceeds to Step S108 and continues in the "HEV mode," whereas in the event that the accelerator position APO is equal to or less than the engine-start line, the routine proceeds to Step S107, and transitions to the "EV mode."

Here, when the "HEV mode" during travel is an "HEV mode" resulting from a transition due to the accelerator position APO rising above a base start line or expansion start line, a base stop line is implemented as the engine-stop line. On the other hand, when the "HEV mode" during travel is an "HEV mode" resulting from a transition due to the accelerator position APO rising above a contraction start line, a contraction stop line is implemented as the engine-stop line.

Specifically, when the engine-start line has been set to a base start line or to an expansion start line, the engine-stop line will be set to a base stop line. When the engine-start line has been set to a contraction start line, the engine-stop line will be set to a contraction stop line.

Figure 19:
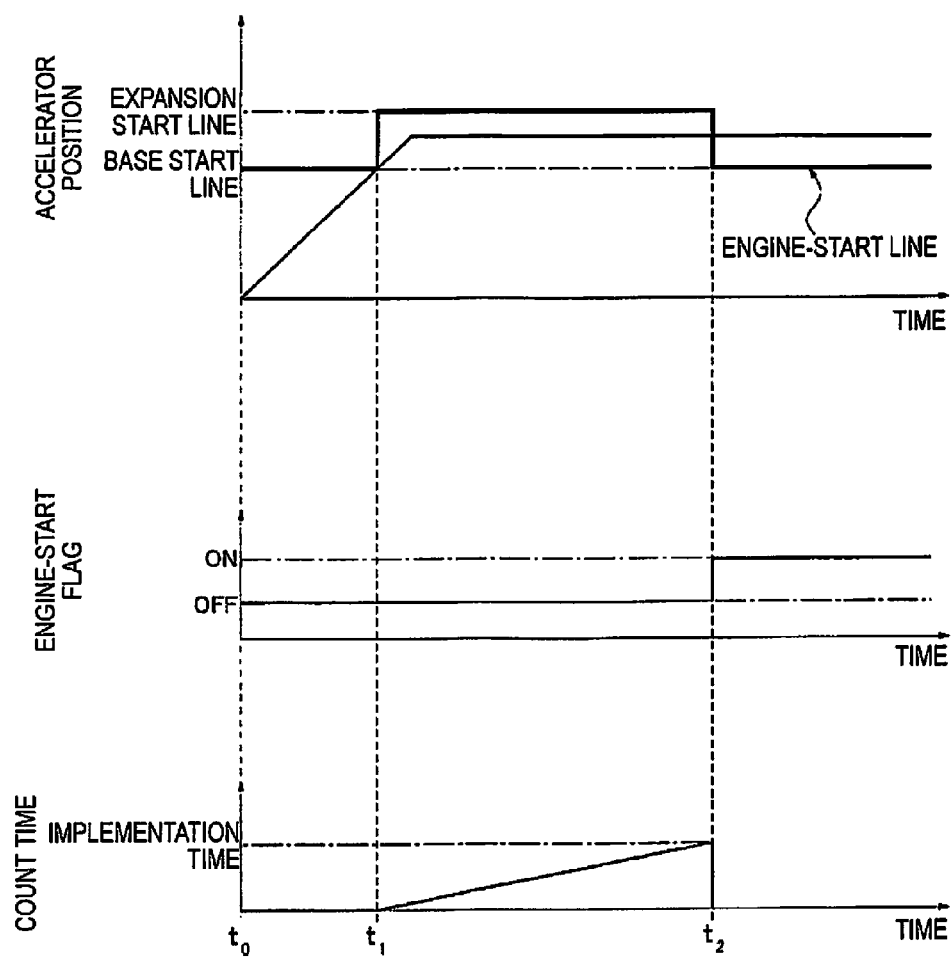
FIG. 19 is a timing chart showing characteristics of an accelerator position, an engine-start flag, and a count time, during implementation of an expansion start line in a hybrid vehicle having the control device of the first embodiment on-board.

In so doing, in cases of expansion or contraction of the engine-start line, the engine-stop line can be set in such a way as to ensure sufficient hysteresis with respect to the engine-start line. For this reason, hunting, i.e., starting and stopping of the engine occurring in cases of frequent increase and decrease of the accelerator position APO, can be prevented Action to Expand the Engine-Start Line Basic Control FIG. 19 is a timing chart showing characteristics of accelerator position, an engine-start flag, and a count time, during implementation of an expansion start line in a hybrid vehicle having the control device of the first embodiment on-board.

During travel in the "EV mode" by the hybrid vehicle S of the first embodiment, in order to set an engine-start line, the routine proceeds from Step S1 to Step S2 to Step S3 in the flowchart shown in FIG. 10, first setting a base start line.

Next, proceeding to Step S4 in the flowchart shown in FIG. 12, the routine proceeds from Step S11 to Step S12 and then to Step S13. When, on the basis of the accelerator position and the intent to accelerate, it is determined that expansion of the engine start line is possible, an expansion engine-start condition is implemented as the engine-start condition, the routine proceeds to Step S14 and to Step S15, whereupon an expansion engine-start line and implementation time therefor are calculated. On the other hand, when on the basis of the intent to accelerate, it is determined to contract the engine-start line, i.e., that an EV travel contraction condition has been met, a contraction engine-start condition is implemented as the engine-start condition, the routine proceeds from Step S13 to Step 16 and then to Step S17, whereupon a contraction engine-start line is calculated. Furthermore, when it is determined on the basis of the intent to accelerate to perform no increase or decrease of the engine-start line, the baseline engine-start condition is implemented as the engine-start condition, and the routine proceeds to Step S16 and then to Step S18, whereupon the base start line is set as the engine-start line.

Here, the calculation of the expansion start line in Step S14 in FIG. 12 is performed according to the procedure of the flowchart shown in FIG. 13. At this time, the offset opening angle of the engine-start line is decided upon on the basis of map A or map B shown in FIG. 14, the maps A and B being maps in which the offset opening angle is set according to the vehicle speed VSP and the state of battery charge SOC, or to the state of battery charge SOC, such that the angle is smaller in association with higher values thereof.

Figure 9:
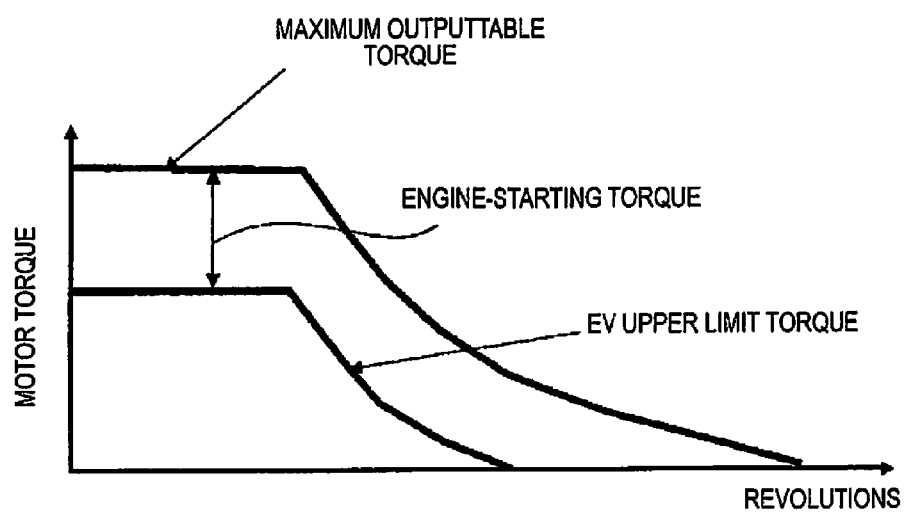
FIG. 9 is a descriptive diagram showing the relationship of motor revolutions and motor torque.

That is, as the vehicle speed VSP increases, the number of output revolutions of the motor-generator 2 rises, and the maximum torque outputtable by the motor-generator 2 becomes smaller (see FIG. 9). Therefore, in cases of high vehicle speed VSP, it is necessary for the EV upper limit torque to be smaller, and at such times the engine-start line cannot be set to a large value. That is, at higher vehicle speeds, it is necessary for the offset opening angle of the engine-start line to be smaller, and for the amount of expansion of the expansion start line to be smaller.

Moreover, as the state of battery charge SOC drops, it is necessary to set a smaller value for the engine-start line and transition to the "HEV mode," increasing the number of opportunities for power generation to restore the state of battery charge SOC. However, there exists a need to improve fuel efficiency, by reducing the frequency of transitioning back to the "EV mode" soon after the engine has started. Moreover, by limiting the expansion time of the engine-start line, unnecessary continuance to maintain the "EV mode" can be prevented. For this reason, the amount of expansion of the expansion start line in cases of a low state of battery charge SOC can be greater than that in the cases of a high state of battery charge SOC.

When the offset opening angle is too great, there exists a possibility of adversely affecting the state of battery charge SOC or fuel economy, and therefor increase in a proper manner is desirable.

The calculation of expansion start line implementation time in Step S15 of FIG. 12 is performed according to the procedure of the flowchart shown in FIG. 15. At this time, the implementation time is decided upon on the basis of the map shown in FIG. 16, this map being map in which the implementation time is set according to the drive torque demand and the state of battery charge SOC, such that the time is shorter in association with higher values thereof.

That is, in the case of a high vehicle speed VSP as discussed above, it is necessary for the EV upper limit torque to be as small as possible, and at such times a time of sufficient length for implementation of the expansion start line cannot be ensured. For this reason, at times of high vehicle speed VSP, it is necessary for the expansion start line implementation time to be relatively short.

In cases of high drive torque demand, motor output torque is high, and the load on the motor is large. Therefore, when an expansion start line implementation time of sufficient length is ensured in such a case, the corresponding load on the motor will continue to be high. For this reason, at times of high drive torque demand, it is necessary for the expansion start line implementation time to be relatively short.

When the expansion start line implementation time is too short, it is possible that fuel economy will not be sufficiently improved, and therefore setting in a proper manner is desirable.

Once an expansion start line condition has been calculated in Step S4 of the flowchart shown in FIG. 10, the routine advances to Step S5, and engine-start line control is performed.

Specifically, as shown in FIG. 19, during travel in the "EV mode," the accelerator position APO rises starting from time t0, and when at this time, in association with the accelerator opening rate $\Delta APO$ rising above the accelerator opening rate threshold value $\Delta APOth$, the driver's intent-to-accelerate represents an ECO decision, a determination is made that expansion start line implementation conditions have been met. The routine then proceeds from Step S41 to Step S42 in the flowchart shown in FIG. 17, setting the base start as the engine-start line, and setting the engine-start condition initially to the baseline engine-start condition.

Here, expansion start line implementation conditions are considered to be met when, in association with the accelerator opening rate $\Delta APO$ rising above the accelerator opening rate threshold value $\Delta APOth$, the driver's intent-to-accelerate represents an ECO decision.

That is, cases in which the accelerator opening rate $\Delta APO$ is smaller than the accelerator opening rate threshold value $\Delta APOth$ correspond to cases in which the accelerator is depressed slowly, so that it can be reliably determined that the accelerator position APO has risen above the engine-start line. In such cases, normally, the vehicle speed and accelerator position will already be fairly high values, and it can be determined that there is a low likelihood of sudden transition to "EV mode" after starting of the engine. In such cases, by not setting an expansion start line, the drive power bump occurring when the engine starts can be minimized, improving the smoothness with which drive power kicks in.

For this reason, the expansion start line implementation condition is set to one specifying that the accelerator opening rate $\Delta APO$ is above the accelerator opening rate threshold value $\Delta APOth$.

Meanwhile, in a one motor/two clutch powertrain system configuration, when the engine-start line has been set to a large value, the motor torque useable for starting the engine is reduced. For this reason, during starting of the engine, it is necessary to lower the engaged torque capacity of the first clutch 4 situated between the engine 1 and the motor-generator 2. However, in this case, a long time will be needed in order to increase the engine revolutions, and acceleration response will suffer. In contrast to this, in cases in which the intent to accelerate represents an ECO decision, and the intent to accelerate is tenuous, the driver will experience minimal discomfort despite slow acceleration response.

For this reason, the expansion start line implementation condition is set at times that the driver's intent to accelerate represents an ECO decision.

At time t1, in the event that the accelerator position APO is equal to or greater than the base start line, the EV travel expansion condition is determined to have been met, and the routine proceeds from Step S43 to Step S44 and then to Step S45, whereupon the expansion start line is set as the engine-start line, and the engine-start condition is changed from the baseline engine-start condition to the expansion engine-start condition. The routine proceeds to Step S46, and time measurement is initiated.

At this time, because the accelerator position APO is below the expanded engine-start line, the "EV mode" continues, and the engine-start flag remains OFF.

At time t2, in the event that the count time has reached the implementation time, the routine proceeds from Step S47 to Step S48, Step S50, Step S51, and then to Step S52, whereupon the base start line is set as the engine-start line, and the engine-start condition is changed back to the baseline engine-start condition. At this time, the count time is reset.

Then, by setting the engine-start line to the base start line, the accelerator position APO rises above the engine-start line, and the engine-start flag goes ON. In so doing, the engine starting process is executed, and a mode transition to the "HEV mode" is performed.

In this manner, according to the hybrid vehicle control device of the first embodiment, when the expansion start line implementation condition is met, once the accelerator position APO rises above the base start line, the expansion start line is implemented only for the duration of a prescribed time (from time t1 to t2); and once the prescribed time has elapsed, the engine-start line is set to the base start line. That is, according to the hybrid vehicle control device of the first embodiment, for the prescribed time interval after the EV travel expansion condition is met, the engine-start condition is changed from the baseline engine-start condition to the expansion engine-start condition.

In so doing, through implementation of the expansion start line for the duration of the prescribed time (from time t1 to t2), the engine 1 does not start, so the "EV mode" can continue, and fuel economy can be improved. By setting the engine-start line to the base start line after the prescribed time (from time t1 to t2) has elapsed, starting of the engine can be performed rapidly, minimizing the increase in load on the motor and excessive consumption of battery power.

Specifically, when the expansion start line is implemented, the accelerator position APO rises above the engine-start line at timing coincident with time t1, and the engine starting process is performed to transition to the "HEV mode." For this reason, no improvement in fuel economy can be expected.

In the event that the expansion start line continues to be implemented, the accelerator position APO will not rise above the engine-start line subsequent to time t2, and therefore the "EV mode" continues on without the engine starting process being performed.

For this reason, there was a possibility of excessive consumption of power from the battery 9, leading to a poor state of battery charge SOC, and of increased frequency of transition to forced generation mode resulting in starting of the engine, leading to poor fuel economy. Moreover, because the accelerator position APO has a large value at the time the engine is started, the motor-generator 2 outputs the maximum outputtable torque to provide the engine-starting torque. For this reason, the load on the inverter 8 controlling the motor-generator 2 increases to the point that there is risk of component failure.

By limiting the expansion start line implementation time, increased load on the motor and excessive consumption of battery power can be minimized, while still improving fuel economy.

Expansion Interrupt Control

Figure 20:
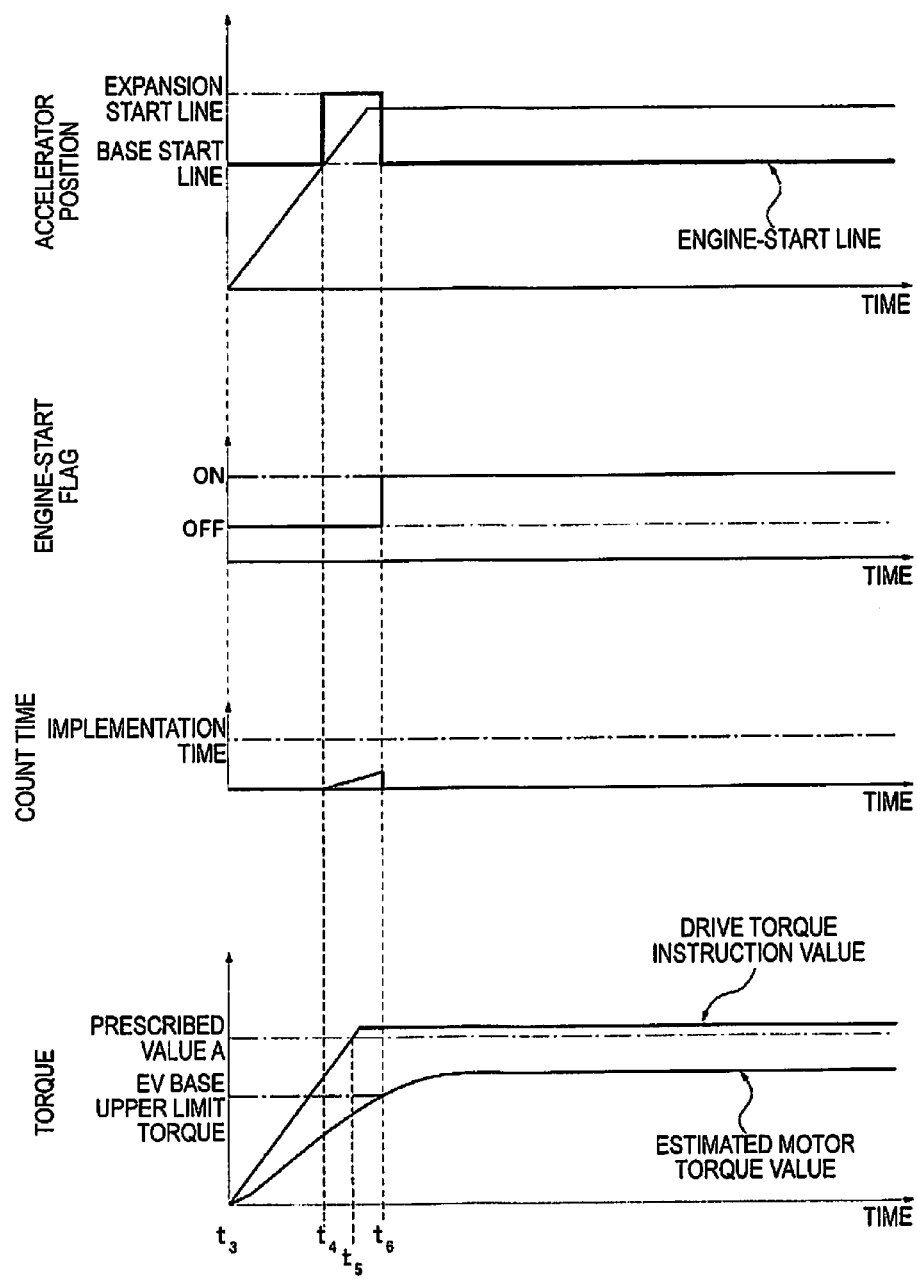
FIG. 20 is a timing chart showing characteristics of an accelerator position, an engine-start flag, a count time, a drive torque instruction value, and an estimated motor torque value, when an estimated motor torque value has exceeded the EV upper limit torque during implementation of an expansion start line in a hybrid vehicle having the control device of the first embodiment on-board.

FIG. 20 is a timing chart showing characteristics of an accelerator position, an engine-start flag, a count time, a drive torque instruction value, and an estimated motor torque value, when an estimated motor torque value has exceeded the EV upper limit torque during implementation of an expansion start line, in a hybrid vehicle having the control device of the first embodiment on-board.

During travel in the "EV mode," the accelerator position APO rises subsequent to time t3, and once it is determined at this time that an expansion start line implementation condition has been met, the routine proceeds from Step S41 to Step S42 in the flowchart shown in FIG. 17, whereupon the base start line is set as the engine-start line, and the engine-start condition is initially set to the baseline engine-start condition.

At time t4, once the accelerator position APO has risen to the base start line or above, the EV travel expansion condition is determined to have been met, and the routine proceeds from Step S43 to Step S44 and then to Step S45, whereupon the expansion start line is set as the engine-start line, and the engine-start condition is changed from the baseline engine-start condition to the expansion engine-start condition. The routine proceeds to Step S46, and time measurement is initiated.

At this time, because the accelerator position APO is below the expanded engine-start line, the "EV mode" continues, and the engine-start flag remains OFF.

Then, at time t5, once the drive torque instruction value rises above the prescribed value A, the routine proceeds from Step S47 to Step S48, and then to Step S49. Furthermore, at time t6, in the event that the estimated motor torque value has reached EV base maximum torque, the routine proceeds from Step S49 to Step S51 and then to Step S52, whereupon in spite of the count time not yet having reached the implementation time, the base start line is set as the engine-start line, and the engine start condition is changed back to the baseline start condition. At this time, the count time is reset.

Then, by setting the engine-start line to the base start line, the accelerator position APO rises above the engine-start line, and the engine-start flag goes ON. In so doing, the engine starting process is executed, and mode transition to the "HEV mode" is performed.

In this manner, according to the hybrid vehicle control device of the first embodiment, in cases in which the drive torque instruction value is equal to or greater than the preset prescribed value A, while at the same time the estimated motor torque value has reached EV base maximum torque, implementation of the expansion start line is interrupted, and the engine-start line is set to the base start line.

In so doing, bumps in drive power during starting of the engine to transition to the "HEV mode" are minimized, reducing discomfort to the driver.

Specifically, in cases in which the engine start line is expanded beyond the base start line, initiation of starting of the engine is delayed, in order to minimize starting of the engine in cases in which the accelerator is inadvertently depressed during acceleration but immediately released thereafter. At this time, the motor torque during travel in the "EV mode" is limited to the EV upper limit torque, and therefore a bump in drive power occurs during the transition to the "HEV mode." For this reason, bumps in drive power can be reduced by interrupting expansion of the engine start line and transitioning to the "HEV mode," at the point in time that the estimated motor torque value has reached the EV upper limit torque, in cases in which the drive torque instruction value (drive torque demand) has exceeded a value equal to the EV base upper limit torque plus the prescribed value A.

Due the effect of the rate of change in drive torque, or of response lags, the estimated motor torque value may experience phase shift with respect to the drive torque instruction value. For this reason, by interrupting implementation of the expansion start line at a point in time at which the drive torque instruction value has exceeded the prescribed value A while the estimated motor torque value has reached the EV upper limit torque, the occurrence of bumps in drive power can be minimized, and the expansion start line can be implemented to maximum extent.

Action to Contract the Engine-Start Line

During travel in the "EV mode" by the hybrid vehicle S of the first embodiment, in cases of definite intent to accelerate by the driver, the routine proceeds from Step S11 to Step S12, Step S13, Step S16, and then to Step S17 in the flowchart shown in FIG. 12, and a contraction start line is calculated.

The routine then proceeds from Step S41 to Step S53 in the flowchart shown in FIG. 17, and the contraction start line is implemented as the engine-start line, setting the engine-start line to a smaller value than the base start line. That is, the engine-start condition is set to a contraction engine-start condition.

In so doing, the engine starting process can be executed at a time when the accelerator position APO is relative small, and acceleration response can be improved.

Action to Maintain Engine-Start Line at Base

During travel in the "EV mode" by the hybrid vehicle S of the first embodiment, in cases of tenuous intent to accelerate by the driver accompanied by fairly slow depression of the accelerator, the routine proceeds from Step S11 to Step S12, Step S13, Step S16, and then to Step S18 in the flowchart shown in FIG. 12, without setting any increase or decrease of the base start line.

The routine then proceeds from Step S41 to Step S53 in the flowchart shown in FIG. 17, implementing the base start line as the engine-start line, so that the base start line is maintained. That is, the engine-start condition is set to the baseline engine-start condition.

In so doing, starting of the engine can be executed in conformance to the driver's intent, without unnecessary advancement or delay of the timing at which the engine is started. Therefore, decline in fuel economy can be minimized, and poor acceleration response prevented.

The effects will be described next.

The control device for a hybrid vehicle according to the first embodiment affords effects such as those listed below by way of example.

(1) According to one aspect of the invention, a hybrid vehicle S provided with:

an engine 1;

a motor (motor-generator) 2 furnished to a drive system leading from the engine 1 to drive wheels (tires) 7,7, for performing starting of the engine 1 and driving of the drive wheels 7, 7; and a mode switching means (first clutch) 4, that when a preset engine-start condition is met, brings about a hybrid vehicle mode (HEV mode) in which rotation of the motor 2 is transmitted to the engine 1, and the engine is started so that the engine 1 and the motor 2 serve as drive sources, and that when a preset engine-stop condition is met, stops the engine 1 and brings about an electric vehicle mode (EV mode) in which the motor 2 serves as the drive source, the mode switching means (first clutch) 4 being furnished to a part linking the engine 1 and the motor 2;

the control device provided with engine-start-condition-controlling means or device (FIG. 10-FIG. 18) that when the vehicle is traveling in the electric vehicle mode, and an EV travel zone expansion condition (Step S41, Step S44) is met causes the engine-start condition to be changed, for a prescribed time (t1-t2) after the EV travel zone expansion condition has been met, from a baseline start condition that prevails when the EV travel zone expansion condition is not met, to an expansion engine-start condition for expanding the travel zone in the electric vehicle mode, the EV travel zone expansion condition being set on the basis of vehicle speed VSP and torque demand information (accelerator position APO) reflective of demand by the driver, and the travel zone in the electric vehicle mode being expanded under the EV travel zone expansion condition.

Therefore, the engine-start line is set to a large value (an expansion start line), and increased load on the motor and excessive consumption of battery power associated with expansion of the EV travel zone can be minimized.

(2) According to another aspect of the invention, under the EV travel zone expansion condition (Step S41), the amount of change, per unit of time, in the torque demand information (accelerator position APO) (accelerator opening rate LAPO) exceeds a preset threshold value of change in torque demand (accelerator opening rate threshold value ΔAPOth).

Therefore, in addition to the effect noted in (1) above, in cases in which it can be determined that there is a demand to start the engine, delay of the timing for starting the engine can be prevented, and the occurrence of bumps in drive power during starting of the engine can be prevented.

(3) According to another aspect of the invention, there is provided intent-to-accelerate-determining means (Step S12) for detecting an intent-to-accelerate index used to determine an intention on the part of the driver to accelerate, the intent-to-accelerate index being equal to or less than a preset intent-to-accelerate threshold value under the EV travel zone expansion condition (Step S41).

Therefore, in addition to the effects noted in (1) and (2) above, discomfort to the driver can be prevented, even when acceleration response is lower.

(4) According to another aspect of the invention, the engine-start-condition-controlling means or device (FIG. 10-FIG. 18) cancels the expansion engine-start condition when transitioning to the hybrid vehicle mode (HEV mode), or when the torque demand information (accelerator position APO) is equal to or less than a preset torque threshold value (prescribed value B).

Therefore, in addition to the effects noted in (1) to (3) above, expansion start lines can be set in a manner always reflective of circumstances such as the vehicle speed VSP, the state of battery charge SOC, and the like, allowing for implementation of an engine-start line matched to the state of travel.

(5) According to another aspect of the invention, the engine-start-condition-controlling means or device (FIG. 10-FIG. 18) sets a time at which to set the engine-start condition to the expansion engine-start condition (implementation time), the time being set on the basis of the torque demand information (drive torque demand) and the state of battery charge SOC.

Therefore, in addition to the effects noted in (1) to (4) above, times for implementation of expansion engine-start lines can be set in an appropriate fashion, with reference to balancing management of the state of battery charge SOC and fuel economy.

(6) According to another aspect of the invention, in a case in which, prior to the elapsing of a period of time over which the engine-start condition is set to the expansion engine-start condition (implementation time), the torque demand information (drive torque instruction value) is equal to or greater than a preset torque demand threshold value (prescribed value A), and the motor output torque (estimated motor torque value) is equal to or greater than an upper limit value of motor travel torque (EV base upper limit torque) that can be employed for travel in an electric travel mode when the engine-start condition has been set to the baseline engine-start condition, the engine-start-condition-controlling means or device (FIG. 10-FIG. 18) changes the engine-start condition from the expansion engine-start condition to the baseline engine-start condition.

Therefore, in addition to the effects noted in (1) to (5) above, occurrence of a bump in drive power during mode transition from "EV mode" to "HEV mode" can be minimized, so that the driver is not made uncomfortable.

(7) According to another aspect of the invention, under the expansion engine-start condition, the torque demand information (accelerator position APO) has exceeded an expansion start line set to a larger value than a preset base start line at a vehicle speed VSP, and the engine-start-condition-controlling means or device (FIG. 10-FIG. 18) sets the amount of expansion of the expansion start line with respect to the base start line, on the basis of the vehicle speed VSP and the state of battery charge SOC.

Therefore, in addition to the effects noted in (1) to (6) above, the amount of expansion of expansion start lines can be set in an appropriate fashion, with reference to balancing management of the state of battery charge SOC and fuel economy.

(8) According to another aspect of the invention, under the expansion engine-start condition, torque demand information reflective of demand by the driver (accelerator position APO) has exceeded an engine-start line which has been set according to vehicle speed VSP, under the engine-stop condition, the torque demand information (accelerator position APO) is below an engine-stop line which has been set according to vehicle speed VSP, the engine-start-condition-controlling means or device (FIG. 10-FIG. 18), when setting the engine-start condition to the expansion engine-start condition, sets the engine-stop line to a base stop line derived by subtracting preset hysteresis from a base start line preset according to vehicle speed VSP, and when setting the engine-start line to a contraction start line of a smaller value than the base start line, sets the engine-stop line to a contraction stop line derived by subtracting preset hysteresis from the contraction start line.

Therefore, in addition to the effects noted in (1) to (7) above, hunting during starting and stopping of the engine can be prevented, regardless of whether the engine-start line is a base start line, or an expanded or contracted start line.

Embodiment 2

A second embodiment relates to an example in which an engine-start line (intent-to-accelerate start line) is set according to intent to accelerate, and the smaller of an expansion start line and the intent-to-accelerate start line is selected as the final engine-start line.

Figure 21:
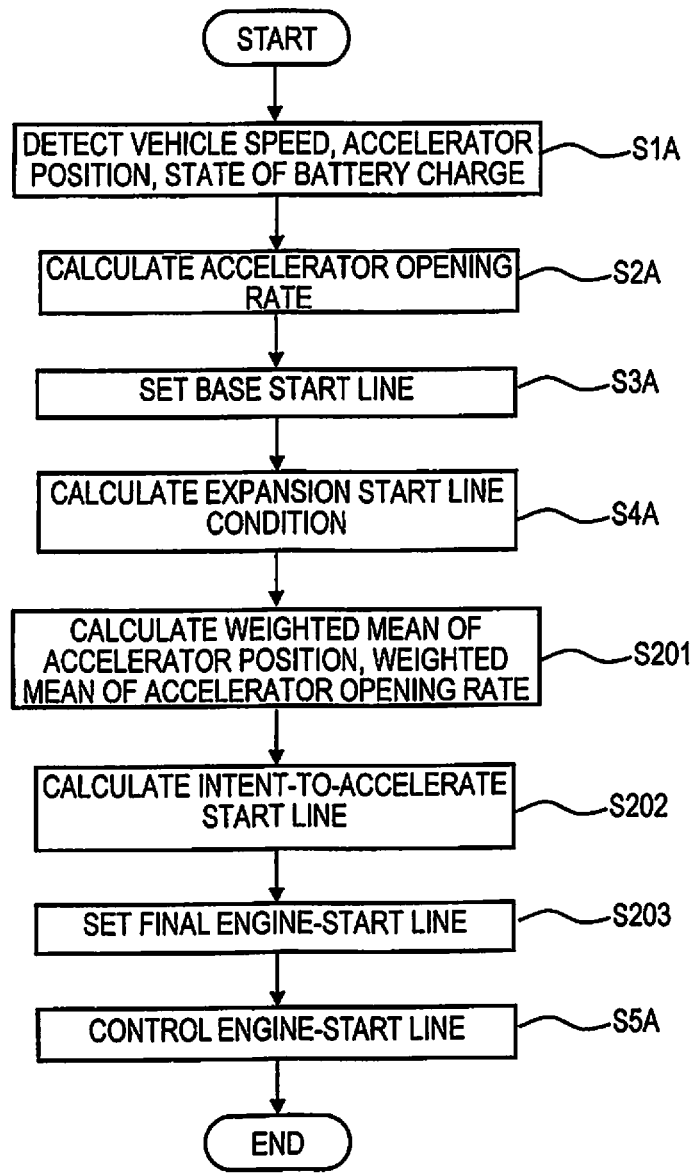
FIG. 21 is a flowchart showing the flow of an engine-start condition setting process executed by the integrated controller of a second embodiment.

FIG. 21 is a flowchart showing the flow of an engine-start condition setting process executed by the integrated controller of a second embodiment. The steps of FIG. 21 are described below.

In Step S1A, the vehicle speed VSP, the accelerator position APO, and the state of battery charge SOC are detected, and the routine advances to Step S2.

Here, the vehicle speed VSP is calculated through multiplication of a preset proportionality coefficient, by the number of rotations of the output shaft of the automatic transmission 3 detected by the AT output shaft rotation sensor 13. The accelerator position APO is detected by the accelerator position sensor 17. The state of battery charge SOC is detected by the SOC sensor 16.

In Step S2A, following detection of values in Step S1A, an accelerator opening rate ΔAPO which represents the rate of change (amount of change), per unit of time, of the accelerator position APO that was detected in Step S1A is calculated, and the routine advances to Step S3A.

In Step S3A, following calculation of the accelerator opening rate ΔAPO in Step S2A, a base start line, which is an engine-start line to serve as a benchmark in the engine-start/stop line map, (shown by a solid line in FIG. 11) is set, and the routine advances to Step S4A.

In Step S4A, following setting of the base start line in Step S3A, the expansion start line condition calculation process shown in the first embodiment is used to set an expansion start line and a contraction start line, as well as to calculate an expansion start line implementation time, whereupon the routine advances to Step S201.

In Step 201, following calculation of the expansion start line condition in Step S4A, a weighted mean value of the accelerator position APO detected in Step S1A, and a weighted mean value of the accelerator opening rate $\Delta APO$ calculated in Step S2A, are respectively calculated, and the routine advances to Step S202.

The weights for the values can be set arbitrarily.

In Step S202, following calculation of the weighted mean values in Step S201, an intent-to-accelerate start line is calculated on the basis of a sum mean value of the calculated weighted mean values (hereinafter termed the total weighted mean value a), and the routine advances to Step S203.

Here, the "intent-to-accelerate start line" refers to an engine-start line which is set with consideration of the driver's intent to accelerate, and in cases in which the total weighted mean value $\alpha$ is greater than a preset weighted mean threshold value $\alpha$th, is set to a greater value than the base start line. In cases in which the total weighted mean value $\alpha$ is less than the preset weighted mean threshold value $\alpha$th, the line is set to a smaller value than the base start line.

Figure 22:
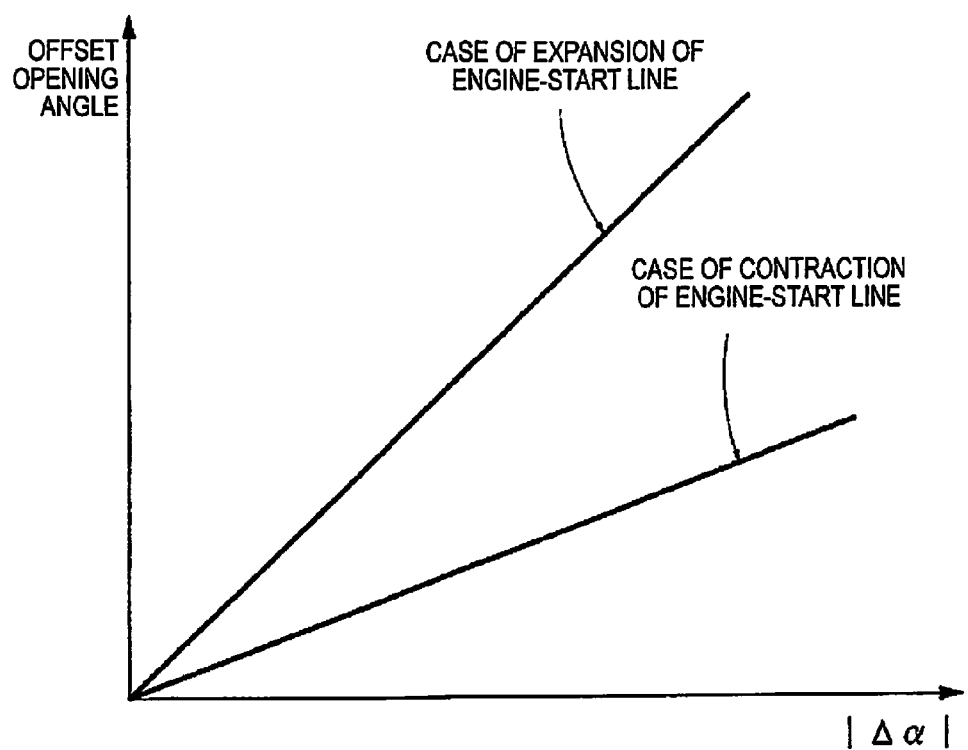
FIG. 22 is a descriptive diagram describing the relationship of offset opening angle and weighted mean difference of an intended acceleration start line.

At this time, as shown in FIG. 22, the offset opening angle (the amount of expansion or contraction from the base start line) is increased in commensurate fashion, in association with a greater differential between the total weighted mean value $\alpha$ and the weighted mean threshold value $\alpha$th (hereinafter termed weighted mean differential $|\Delta\alpha|$). Furthermore, in cases in which the total weighted mean value $\alpha$ is large and the engine-start line is expanded, the offset opening angle is made larger than in cases in which the total weighted mean value $\alpha$ is small and the engine-start line is contracted, even when the weighted mean differential $|\Delta\alpha|$ values are the same.

In Step S203, following setting of the intent-to-accelerate start line in Step S202, the smallest value from among this intent-to-accelerate start line, the base start line set in Step S3A, and the expansion start line calculated in Step S4A, is set as a final engine-start line, and the routine advances to Step S5A.

In Step S5A, following setting of the final engine-start line in Step S203, the engine-start line for implementation during travel in the "EV mode" is controlled through the engine-start line control process shown in the first embodiment, and the routine advances to RETURN.

Next, actions of the second embodiment will be described in terms of an "engine-start line control process in the case of low intent to accelerate," and an "engine-start line control process in the case of high intent to accelerate," respectively.

(Engine-Start Line Control Process in the Case of Low Intent to Accelerate)

Figure 23:
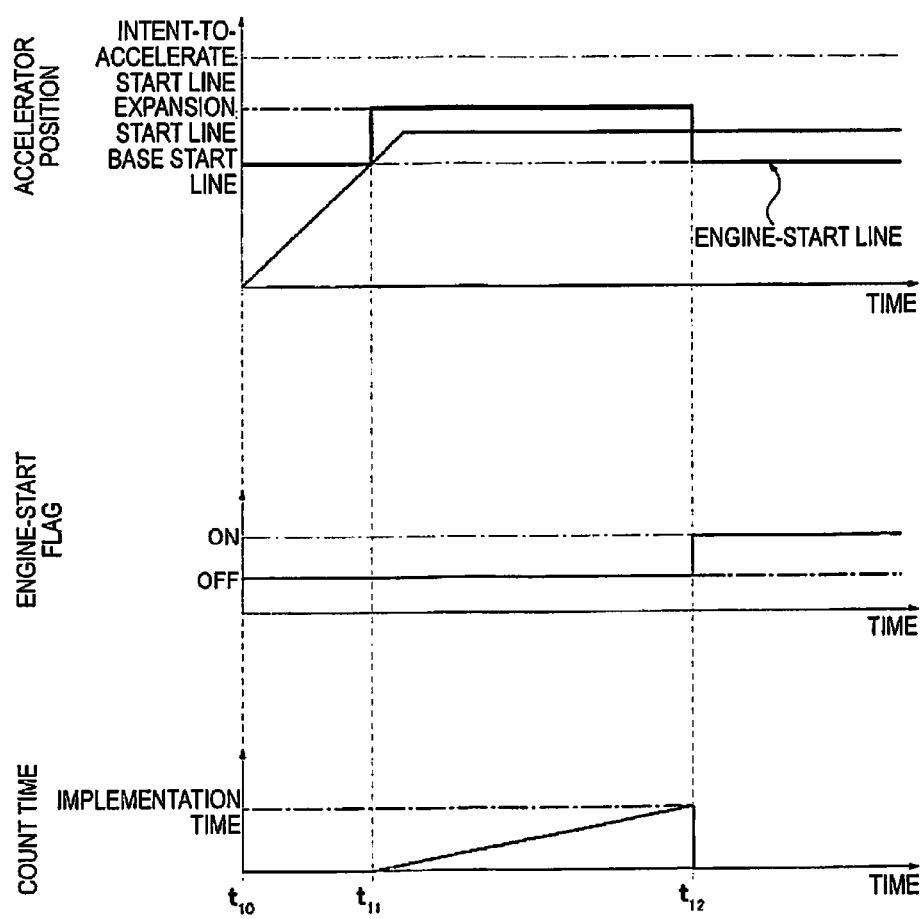
FIG. 23 is a timing chart showing characteristics of an accelerator position, an engine-start flag, and a count time, when intended acceleration is low in a hybrid vehicle having on-board the control device of the second embodiment.

FIG. 23 is a timing chart showing characteristics of an accelerator position, an engine-start flag, and a count time, when intended acceleration is low in a hybrid vehicle having on-board the control device of the second embodiment.

During travel in the "EV mode" by the hybrid vehicle S of the second embodiment, in order to set an engine-start line, the routine proceeds from Step S1A to Step S2A and then to Step S3A in the flowchart shown in FIG. 21, whereupon firstly, a base start line is set.

Subsequently, proceeding to Step S4A, in the event of a determination, on the basis of the accelerator position and the intent to accelerate, that expansion of the engine-start line is possible, an expansion engine-start line and implementation time therefor are calculated.

The routine next proceeds from Step S201 to Step S202, and once a weighted mean value of the accelerator position APO and a weighted mean value of the accelerator opening rate $\Delta APO$ have been calculated, an intent-to-accelerate start line is set. The routine then proceeds to Step S203, in which the smallest value from among the intent-to-accelerate start line, the base start line, and the expansion start line is set as the final engine-start line, whereupon the routine proceeds to Step S5A, and engine start control is performed.

Specifically, as shown in Step S23, during travel in the "EV mode," the accelerator position APO increases starting at time t10, and in the event that at this time the total weighted mean value $\alpha$ is large and the intent to accelerate is low, the intent-to-accelerate start line is set to a value that is considerably greater than the base start line and the expansion start line.

For this reason, starting at time t10, the base start line has the smallest value, and is set as the final engine-start line. At this time, because the accelerator position APO is below the final engine-start line (the base start line), the "EV mode" continues, and the engine-start flag remains OFF.

At time t11, once the accelerator position APO reaches the base start line, the expansion start line is implemented as the engine-start line. At this time, because the intent-to-accelerate start line is a greater value than the expansion start line, the expansion start line is implemented as the final engine-start line.

Through implementation of the expansion start line, measurement of implementation time is initiated, and the count time begins to increase. Because the accelerator position APO is below the final engine-start line (the base start line), the "EV mode" continues, and the engine-start flag remains OFF.

At time t12, in the event that the count time has reached the implementation time, the base start line is set as the engine-start line. Because this base start line is a smaller value than the intent-to-accelerate start line, the base start line is implemented as the final engine-start line. Further, the count time is reset.

At a point in time at time t12, the accelerator position APO rises above the final engine-start line (the base start line), and the engine-start flag goes to ON. In so doing, the engine starting process is executed, and a mode transition to the "HEV mode" is performed.

In this manner, according the control device for a hybrid vehicle of the second embodiment, in cases in which the intent-to-accelerate start line is a large value, the expansion start line, which is a smaller value, is implemented as the final engine-start line. For this reason, the timing for starting the engine can be delayed, improving fuel economy, while minimizing the load on the motor, as well as preventing excessive consumption of battery power.

Engine-Start Line Control Process in the Case of High Intent to Accelerate

Figure 24:
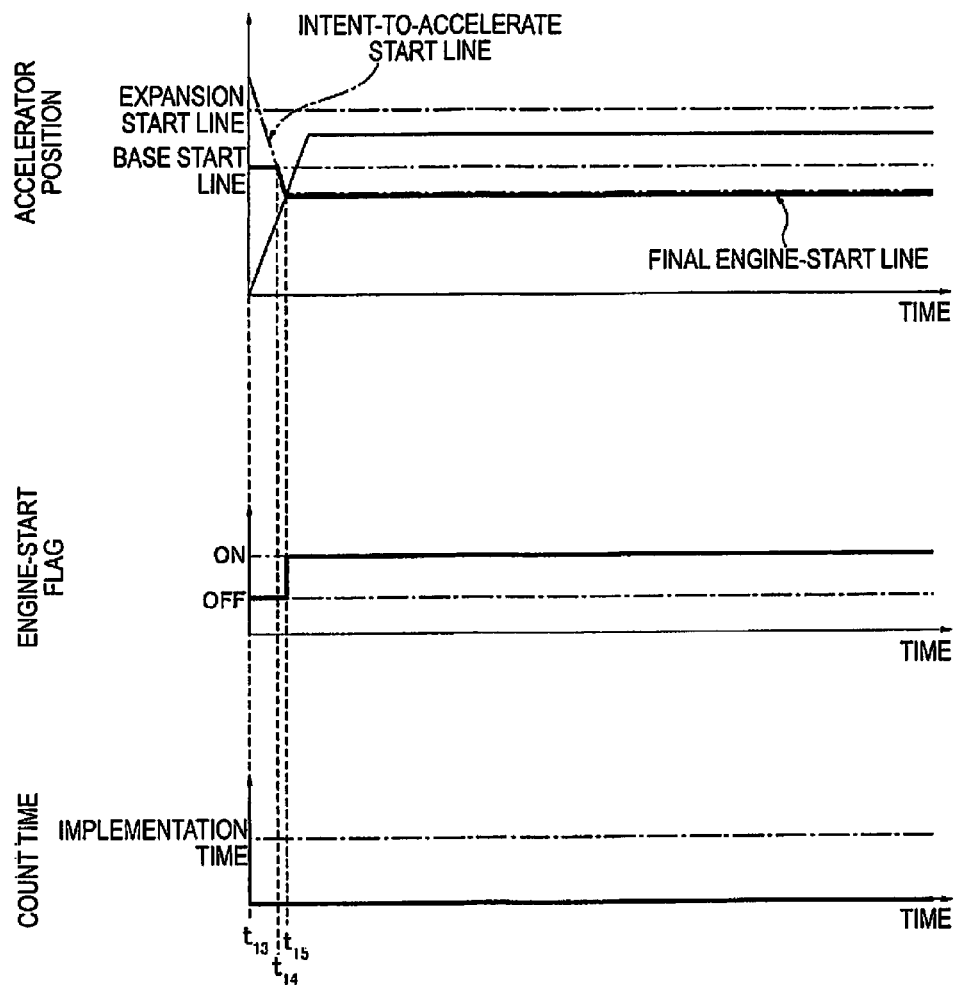
FIG. 24 is a timing chart showing characteristics of an accelerator position, an engine-start flag, and a count time, when intended acceleration is high in a hybrid vehicle having on-board the control device of the second embodiment.

FIG. 24 is a timing chart showing characteristics of an accelerator position, an engine-start flag, and a count time, when intended acceleration is high in a hybrid vehicle having on-board the control device of the second embodiment.

During travel in the "EV mode" by the hybrid vehicle S of the second embodiment, in the event that, in association with a change in the accelerator position APO, the total weighted mean value $\alpha$ is smaller and the intent to accelerate is higher, at a point in time at time t14, the intent-to-accelerate start line is set to a smaller value than the base start line and the expansion start line as shown in FIG. 24. Therefore, the intent-to-accelerate start line is implemented as the final engine-start line. During the interval from time t13 to t14, the base start line is the smallest value, and therefore the base start line is implemented as the final engine-start line.

Then, at a point in time at time t15, in the event that the accelerator position APO has risen above the final engine-start line (the intent-to-accelerate start line), the engine-start flag goes to ON. In so doing, the engine starting process is executed, and a mode transition to the "HEV mode" is performed.

In this case, because the expansion engine-start line is not implemented as the final engine-start line, measurement of implementation time is not performed, and a count time is not generated.

In this manner, according the control device for a hybrid vehicle of the second embodiment, in cases in which the driver is determined to have high intent to accelerate, the final engine-start line is set to a small value matched to the intent to accelerate, so that demand for acceleration can be responded to with good response.

Specifically, expansion of the engine-start line within an appropriate range can be achieved exclusively in cases of low intent to accelerate, preventing worsening of acceleration response.

During setting of a intent-to-accelerate start line, the offset opening angle is set to a larger value in cases in which the total weighted mean value $\alpha$ is large and the engine-start line is expanded, than in cases in which the total weighted mean value $\alpha$ is small and the engine-start line is contracted, for the same given weighted mean differential $|\Delta\alpha|$ value. In so doing, while taking into consideration the balance between fuel economy performance versus management of battery power, load on the motor, and the like, setting of intent-to-accelerate start lines can be performed in a manner that appropriately reflects the intent to accelerate.

The effects will be described next.

The control device for a hybrid vehicle according to the second embodiment affords effects such as those listed below by way of example.

(9) According to another aspect of the invention, under the engine-starting condition, torque demand information reflective of demand by the driver has exceeded an engine start line set according to vehicle speed VSP, the engine-start line control means (FIG. 21) calculates an expansion start line set to a larger value than a base start line preset according to vehicle speed VSP, and an intent-to-accelerate for which there is assumed a greater value with respect to the base start line preset according to vehicle speed VSP, when the sum (total weighted mean value $\alpha$) of a weighted mean value of the accelerator position APO and a weighted mean value of the accelerator opening rate $\Delta$APO is equal to or greater than a preset threshold value (weighted mean threshold value) at, and for which there is assumed a smaller value with respect to the base start line, when the sum (total weighted mean value $\alpha$) of the weighted mean value of the accelerator position APO and the weighted mean value of the accelerator opening rate $\Delta$APO is less than the preset threshold value weighted mean threshold value) at, and the smaller of the expansion start line and the intent-to-accelerate start line is implemented as the final engine-start line.

Therefore, in addition to the effects noted in (1) to (8) above, expansion of the engine-start line within an appropriate range can be achieved exclusively in cases of low intent to accelerate, preventing worsening of acceleration response.

(10) According to another aspect of the invention, the intent-to-accelerate line is set to a value such that the amount of expansion when set to a larger value with respect to the base start line is greater than the amount of contraction when set to a smaller value with respect to the base start line, with respect to the absolute value (weighted mean differential $|\Delta\alpha|$) of the differential between the sum (total weighted mean value $\alpha$) of the weighted mean value of the accelerator position APO and the weighted mean value of the accelerator opening rate $\Delta$APO.

Therefore, in addition to the effect noted in (9) above, while taking into consideration the balance between fuel economy performance versus management of battery power, load on the motor, and the like, setting of intent-to-accelerate start lines can be performed in an manner that appropriately reflects the intent to accelerate.

While the control device for a hybrid vehicle of the present invention has been described hereinabove on the basis of the first embodiment and the second embodiment, the specific configuration is not limited to these embodiments, and various design modifications, additions, and the like are permissible within the scope of the invention as set forth in the claims.

In the first embodiment, the "EV travel zone expansion condition" is one specifying expansion of the engine-start line with respect to the base start line, when the accelerator opening rate $\Delta$APO has risen above the accelerator opening rate threshold value $\Delta$APOth, and additionally the intent-to-accelerate represents an ECO decision. However, it would be acceptable to instead expand the engine-start line when either one of a condition that the accelerator opening rate $\Delta$APO has risen above the accelerator opening rate threshold value $\Delta$APOth, and a condition that the intent-to-accelerate represents an ECO decision, has been met.

In this case as well, drops in fuel economy can be minimized, and discomfort with respect to acceleration response can be prevented.

Moreover, in the first embodiment, during setting of an expansion start line, the offset opening angle with respect to the base start line is set, in cases in which map A is employed, on the basis of the vehicle speed VSP and the state of battery charge SOC; but could instead be set, for example, on the basis of the state of battery charge SOC only, as in cases in which map B is employed, or set on the basis of vehicle speed VSP only.

Furthermore, the time for implementation of expansion start lines may be set on the basis of the drive torque demand and/or the state of battery charge SOC. The accelerator position APO may be employed in place of drive torque demand, for the expansion start line implementation time.

Furthermore, when the state of battery charge SOC is equal to or less than a prescribed value, the offset opening angle of the engine start line may be set to zero, or offset in a direction of contraction with respect to the base start line, until the necessary state of battery charge SOC is recovered.

Furthermore, in the preceding embodiments, whereas the accelerator position APO, drive torque demand, and drive torque instruction values are employed as "torque demand information reflective of demand by the driver," other values may be implemented as well, provided that the values change in a manner reflective of demand by the driver.

In the first embodiment, there was shown an example selecting the second clutch 5 from among friction elements incorporated into the stepped automatic transmission 3.

However, it is acceptable for the second clutch 5 to be provided separately from the automatic transmission 3, including, for example, an example in which the second clutch 5 is furnished separately from the automatic transmission 3, between the motor-generator 2 and the transmission output shaft; or an example in which the second clutch 5 is furnished separately from the automatic transmission 3, between the transmission output shaft and the tires 7, 7.

In the first embodiment, there was shown in an example in which the first clutch 4 is employed as the mode switching means for switching between HEV mode and EV mode. However, another acceptable example of the mode switching means for switching between HEV mode and EV mode is one employing a planetary gear, or other such differential device or power splitting device having a clutch function without employing a clutch.

In the first embodiment, the engine-start condition specifies that, with the "EV mode" selected, the accelerator position APO exceeds the engine-start line, but there is no limitation thereto. Other conditions (for example, that vehicle speed is equal to or greater than a prescribed value, the number of revolutions of the motor is equal to or greater than a prescribed value, the battery SOC is equal to or less than a prescribed value, or the like) are acceptable as well. Likewise, the engine-stop condition is not limited to [one specifying that] the accelerator position APO has fallen below the engine-stop line.

The invention claimed is:

1. A control device for a hybrid vehicle, the hybrid vehicle including an engine, a motor for a drive system extending from the engine to a drive wheel and for starting the engine and driving the drive wheel, and a mode switching device configured to bring about a hybrid vehicle mode in which rotation of the motor is transmitted to the engine when a preset engine-start condition is met and the engine is started so that the engine and the motor serve as drive sources, and being configured to stop the engine and bring about an electric vehicle mode in which the motor serves as the drive source when a preset engine-stop condition is met, the mode switching device being provided to a part linking the engine and the motor, the control device comprising:

an engine-start-condition-controlling device programmed to cause the engine-start condition to be changed when the vehicle is traveling in electric vehicle mode and an electric vehicle travel zone expansion condition is met for a prescribed time after the electric vehicle travel zone expansion condition has been met, from a baseline start condition that prevails when the electric vehicle travel zone expansion condition is not met to an expansion engine-start condition for expanding the travel zone in the electric vehicle mode, the electric vehicle travel zone expansion condition being set on the basis of vehicle speed and torque demand information reflective of demand by a driver, and the travel zone in the electric vehicle mode being expanded under the electric vehicle travel zone expansion condition, the engine-start-condition-controlling device being further programmed to set a time at which to set the engine-start condition to the expansion engine-start condition, the time being set based on at least one of the torque demand information and a state of battery charge.

2. The control device for a hybrid vehicle according to claim 1, wherein the engine-start-condition-controlling device is programmed to cancel the expansion engine-start condition when the expansion engine-start condition is met, or when the torque demand information is equal to or less than a preset torque threshold value.

3. The control device for a hybrid vehicle according to claim 1, wherein the engine-start-condition-controlling device being programmed to cause the engine-start condition to be changed when the vehicle is traveling in the electric vehicle mode and the electric vehicle travel zone expansion condition is met, and prior to the elapsing of a period of time over which the engine-start condition is set to the expansion engine-start condition, the torque demand information is equal to or greater than a preset torque demand threshold value, and motor output torque is equal to or greater than an upper limit value of motor travel torque that can be employed for travel in an electric travel mode when the engine-start condition has been set to the baseline engine-start condition, the engine-start-condition-controlling device being configured to change the engine-start condition from the expansion engine-start condition to the baseline engine-start condition.

4. The control device for a hybrid vehicle according to claim 1, wherein the engine-start-condition-controlling device being programmed to cause the engine-start condition to be changed when the vehicle is traveling in the electric vehicle mode and the electric vehicle travel zone expansion condition is met, and under the expansion engine-start condition, the torque demand information has exceeded an expansion start line set to a larger value than a base start line preset according to vehicle speed, and the engine-start-condition-controlling device is configured to set the amount of expansion of the expansion start line with respect to the base start line, on the basis of the vehicle speed and/or the state of battery charge.

5. The control device for a hybrid vehicle according to claim 1, wherein the engine-start-condition-controlling device being programmed to cause the engine-start condition to be changed when the vehicle is traveling in the electric vehicle mode and the electric vehicle travel zone expansion condition is met, and under the expansion engine-start condition, torque demand information reflective of demand by the driver has exceeded an engine-start line which has been set according to vehicle speed, under the engine-stop condition, the torque demand information is below an engine stop line which has been set according to vehicle speed, the engine-start-condition-controlling device, when setting the engine-start condition to the expansion engine-start condition, is programmed to set the engine-stop line to a base stop line obtained by subtracting preset hysteresis from a base start line preset according to vehicle speed, and when setting the engine-start line to a contraction start line of a smaller value than the base start line, is configured to set the engine-stop line to a contraction stop line derived by subtracting preset hysteresis from the contraction start line.

6. The control device for a hybrid vehicle according to claim 1, wherein the engine-start-condition-controlling device being programmed to cause the engine-start condition to be changed when the vehicle is traveling in the electric vehicle mode and the electric vehicle travel zone expansion condition is met, under the electric vehicle travel zone expansion condition, the amount of change, per unit of time, in the torque demand information exceeds a preset threshold value of change in torque demand.

7. The control device for a hybrid vehicle according to claim 6, further comprising
an intent-to-accelerate-determining device programmed to detect an intent-to-accelerate index used to determine an intention on the part of the driver to accelerate, the intent-to-accelerate index being equal to or less than a preset intent-to-accelerate threshold value under the electric vehicle travel zone expansion condition.

8. The control device for a hybrid vehicle according to claim 6, wherein
the engine-start-condition-controlling device is programmed to cancel the expansion engine-start condition when the expansion engine-start condition is met, or when the torque demand information is equal to or less than a preset torque threshold value.

9. The control device for a hybrid vehicle according to claim 1, further comprising
an intent-to-accelerate-determining device programmed to detect an intent-to-accelerate index used to determine an intention on the part of the driver to accelerate, the intent-to-accelerate index being equal to or less than a preset intent-to-accelerate threshold value under the electric vehicle travel zone expansion condition.

10. The control device for a hybrid vehicle according to claim 9, wherein
the engine-start-condition-controlling device is programmed to cancel the expansion engine-start condition when the expansion engine-start condition is met, or when the torque demand information is equal to or less than a preset torque threshold value.

11. The control device for a hybrid vehicle according to claim 1, wherein
the engine-start-condition-controlling device is programmed to cause the engine-start condition to be changed when the vehicle is traveling in the electric vehicle mode and the electric vehicle travel zone expansion condition is met, and under the engine-starting condition, torque demand information reflective of demand by the driver has exceeded an engine start line set according to vehicle speed,
the engine-start-condition-controlling device is programmed to calculate an expansion start line set to a larger value than a base start line preset according to vehicle speed, and
an intent-to-accelerate for which there is assigned a greater value with respect to the base start line when a weighted mean value of the accelerator position or a weighted mean value of the accelerator opening rate is equal to or greater than a preset threshold value, and for which there is assigned a smaller value with respect to the base start line when the weighted mean value of the accelerator position or the weighted mean value of the accelerator opening rate is less than the preset threshold value and
the smaller of the expansion start line and the intent-to-accelerate start line is implemented as a final engine-start line.

12. The control device for a hybrid vehicle according to claim 11, wherein
the engine-start-condition-controlling device being programmed to cause the engine-start condition to be changed when the vehicle is traveling in the electric vehicle mode and the electric vehicle travel zone expansion condition is met, and the intent-to-accelerate line is set to a value such that, with respect to the absolute value of the difference between the threshold and either the weighted mean value of the accelerator position or the weighted mean value of the accelerator opening rate, the amount of expansion when set to a larger value with respect to the base start line is greater than the amount of contraction when set to a smaller value with respect to the base start line.

\* \* \* \* \*